United States Patent
Horvitz

(10) Patent No.: US 7,251,696 B1
(45) Date of Patent: Jul. 31, 2007

(54) SYSTEM AND METHODS ENABLING A MIX OF HUMAN AND AUTOMATED INITIATIVES IN THE CONTROL OF COMMUNICATION POLICIES

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 960 days.

(21) Appl. No.: 10/281,718

(22) Filed: Oct. 28, 2002

Related U.S. Application Data

(63) Continuation-in-part of application No. 09/809,142, filed on Mar. 15, 2001.

(51) Int. Cl.
*G06F 15/16* (2006.01)
*H04M 3/42* (2006.01)
*H04M 11/04* (2006.01)

(52) U.S. Cl. ............... 709/228; 709/227; 709/229; 709/222; 379/114.01; 379/201.01; 455/404.2

(58) Field of Classification Search ........ 709/220–222, 709/227–229; 455/414–420, 405; 379/256–266, 379/114.01; 706/61; 714/43; 705/7
See application file for complete search history.

(56) References Cited

U.S. PATENT DOCUMENTS 4,672,632 A    6/1987   Andersen (Continued)

FOREIGN PATENT DOCUMENTS

WO    9800787    1/1998

OTHER PUBLICATIONS

Andrew Silver, John Larkins and Dave Stringer, "Unified Network Presence Management", Nortel Networks Wireless Solutions, 6 pages.

(Continued)

*Primary Examiner*—Glenton B. Burgess
*Assistant Examiner*—Brendan Y. Higa
(74) *Attorney, Agent, or Firm*—Amin, Turocy & Calvin, LLP

(57) ABSTRACT

A system and method for identifying communication channels and appropriate timing of communications that facilitate enhancing or maximizing the utility of a communication between communicating parties, based on the participants' preferences and capabilities is provided. The system and method implement policies for facilitating optimal communications between communicating parties based on deterministic and/or uncertain preferences, capabilities and context, both present and predicted, where a decision to employ an initially selected channel and timing of communication may be overridden by contactor or contactee based on user-configurable triggers. The system and method further provide for mixed/multi-initiative overriding of the identified optimal communication channel and indicated best time for a communication. The methods can be implemented on a widescale communication system or within a single portable device. In one approach, the system attempts to optimize the inferred or directly accessed preferences of a contactee given the accessed or inferred preferences, capabilities and goals of the contactor while keeping the rationale and context of the contactee private. Such optimization can be achieved using preferences and policies concerning handling the attempted contact based on a deterministic specification or through inferring context, content and task under uncertainty by employing probabilistic or decision-theoretic inferences to attempt to maximize the expected utility of the communication to the contactee.

40 Claims, 27 Drawing Sheets

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,615,342 A | 3/1997 | Johnson | |
| 5,790,801 A | 8/1998 | Funato | |
| 5,812,865 A * | 9/1998 | Theimer et al. | 709/228 |
| 5,841,854 A | 11/1998 | Schumacher et al. | |
| 5,859,979 A | 1/1999 | Tung et al. | |
| 5,893,075 A | 4/1999 | Plainfield et al. | |
| 5,960,423 A | 9/1999 | Chaudhuri et al. | |
| 5,963,910 A | 10/1999 | Ulwick | |
| 6,014,135 A | 1/2000 | Fernandes | |
| 6,032,189 A | 2/2000 | Jinzenji et al. | |
| 6,044,486 A | 3/2000 | Underseth | |
| 6,112,098 A | 8/2000 | Flint et al. | |
| 6,163,683 A | 12/2000 | Dunn et al. | |
| 6,167,450 A | 12/2000 | Angwin et al. | |
| 6,181,684 B1 | 1/2001 | Turcotte et al. | |
| 6,188,905 B1 | 2/2001 | Rudrapatna et al. | |
| 6,212,550 B1 | 4/2001 | Segur | |
| 6,243,398 B1 * | 6/2001 | Kahane et al. | 370/522 |
| 6,272,146 B1 | 8/2001 | Bowater et al. | |
| 6,292,480 B1 | 9/2001 | May | |
| 6,336,194 B1 | 1/2002 | Dahman et al. | |
| 6,385,454 B1 | 5/2002 | Bahl et al. | |
| 6,421,655 B1 | 7/2002 | Horvitz et al. | |
| 6,438,217 B1 | 8/2002 | Huna | |
| 6,438,603 B1 | 8/2002 | Ogus | |
| 6,463,265 B1 | 10/2002 | Cohen et al. | |
| 6,466,232 B1 | 10/2002 | Newell et al. | |
| 6,493,685 B1 | 12/2002 | Ensel et al. | |
| 6,513,046 B1 | 1/2003 | Abbott, III et al. | |
| 6,549,915 B2 | 4/2003 | Abbott, III et al. | |
| 6,587,876 B1 | 7/2003 | Mahon et al. | |
| 6,654,734 B1 | 11/2003 | Mani et al. | |
| 6,658,095 B1 | 12/2003 | Yoakum et al. | |
| 6,671,695 B2 | 12/2003 | McFadden | |
| 6,697,840 B1 | 2/2004 | Godefroid et al. | |
| 6,738,931 B1 | 5/2004 | Osborn et al. | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,839,554 B2 | 1/2005 | McDowell et al. | |
| 6,842,877 B2 | 1/2005 | Robarts et al. | |
| 6,968,179 B1 | 11/2005 | De Vries | |
| 7,035,923 B1 | 4/2006 | Yoakum et al. | |
| 7,103,806 B1 | 9/2006 | Horvitz | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0112056 A1 | 8/2002 | Baldwin et al. | |
| 2002/0118772 A1 | 8/2002 | Lin | |
| 2002/0138572 A1 | 9/2002 | Delany et al. | |
| 2002/0156879 A1 | 10/2002 | Delany et al. | |
| 2002/0161862 A1 | 10/2002 | Horvitz | |
| 2002/0174199 A1 | 11/2002 | Horvitz | |
| 2003/0004679 A1 | 1/2003 | Tryon et al. | |
| 2003/0023711 A1 | 1/2003 | Purmar et al. | |
| 2003/0033421 A1 | 2/2003 | Haeri et al. | |
| 2003/0046401 A1 | 3/2003 | Abbott et al. | |
| 2003/0097485 A1 | 5/2003 | Horvitz et al. | |
| 2003/0154176 A1 | 8/2003 | Abbott, III et al. | |
| 2003/0191676 A1 * | 10/2003 | Templeton | 705/8 |
| 2004/0143636 A1 | 7/2004 | Horvitz et al. | |
| 2005/0034078 A1 | 2/2005 | Abbott et al. | |

OTHER PUBLICATIONS

European Search Report dated Aug. 28, 2003, for International Application Serial No. 02000906.4-1244-.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Infromation Science 15, Elsevier Science Publishers B.V., 1989, pp. 179-189.

Carlson J., et al., "Channel Expansion Theory and the Experiential Nature of Media Richness Perceptions", Academy of Management vol. 42, No. 2, Apr. 1, 1999, p. 153-170.

* cited by examiner

| | COMM CHANNEL | COMM TIME | SUBJECT MATTER | URGENCY | LOC | ORIDE? | EXT. INFO. | |
|---|---|---|---|---|---|---|---|---|
| COMM$_1$ | A$_1$ | B$_1$ | C$_1$ | D$_1$ | E$_1$ | F$_1$ | G$_1$ | ••• |
| COMM$_2$ | A$_2$ | B$_2$ | C$_2$ | D$_2$ | E$_2$ | F$_2$ | G$_2$ | ••• |
| COMM$_3$ | A$_3$ | B$_3$ | C$_3$ | D$_3$ | E$_3$ | F$_3$ | G$_3$ | ••• |
| COMM$_4$ | A$_4$ | B$_4$ | C$_4$ | D$_4$ | E$_4$ | F$_4$ | G$_4$ | ••• |
| • | • | • | • | • | • | • | • | ••• |
| • | • | • | • | • | • | • | • | ••• |
| • | • | • | • | • | • | • | • | ••• |
| COMM$_Z$ | A$_Z$ | B$_Z$ | C$_Z$ | D$_Z$ | E$_Z$ | F$_Z$ | G$_Z$ | ••• |

SYSTEM AND METHODS ENABLING A MIX OF HUMAN AND AUTOMATED INITIATIVES IN THE CONTROL OF COMMUNICATION POLICIES

REFERENCE TO RELATED APPLICATIONS

This application is a continuation-in-part of U.S. patent application Ser. No. 09/809,142, which was filed Mar. 15, 2001, entitled System and Method For Identifying and Establishing Preferred Modalities or Channels for Communications Based on Participants' Preferences and Contexts.

TECHNICAL FIELD

The present invention relates generally to policies that facilitate optimal communications between communicating parties based on deterministic and/or uncertain preferences, capabilities and context, both present and predicted, where an initially selected channel and/or time for a communication can be overridden based on user-configurable policies and thresholds.

BACKGROUND OF THE INVENTION

A recipient of a communication may prefer to be contacted in a certain way. For example, a first person may prefer to receive email rather than real-time phone calls while a second person may prefer to receive voice mails rather than real-time voice communications. The choices of a communicating party may depend on where they are, who is attempting to contact them, and so on. Conventionally, to satisfy recipient (and/or sender) preferences, a person may perform actions like automatically forwarding voice mail communications via a unified messaging system to an email server or directing a receptionist to route all phone calls to voice mail rather than to the actual person. Such approaches suffer from drawbacks including set up time, inflexibility, a digital on/off quality, and requiring the user of the system to reason concerning whether the preferences apply to all communications, for example.

For example, an experienced secretary may be able to reason concerning how a certain communication should be routed. Rather than inflexibly applying preferences (e.g., automatically routing all phone calls to voice mail), an experienced secretary may decide not to route a phone call from the hospital emergency room to voice mail but rather to page the intended recipient or to interrupt a meeting in which the recipient is participating. However, such skilled personnel may be in short supply, may be expensive to employ and may take years to train. Furthermore, such skilled personnel may have limited availability (e.g., eight hours a day minus coffee breaks).

Thus, the present state of the art is largely dependant upon human reasoning to override preset preferences for modes of communication.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention provides for a system and/or method that identifies a communication channel that optimizes the utility of a communication and then, at a later state, determines whether the initially identified channel should continue to be employed or should be overridden by another channel(s).

One aspect of the invention relates to a system that facilitates maximizing the utility of a communication. An identifier identifies an initially selected communication channel, and an analyzer determines whether the initially selected communication channel should be overridden by an overriding communication channel. It is to be appreciated that the system can be implemented via hardware and/or software as well as being embodied on a computer readable medium. The system can employ uncertainty and deterministic processing.

Another aspect of the subject invention relates to a method for selecting a communication channel. A communication channel is identified that facilitates optimizing the utility of a communication between communicating parties. An override decision is computed concerning whether the identified communication channel should be overridden; and a communication channel is selected for the communication based, at least in part, on the override decision.

While the summary primarily discusses override decisions associated with the recipient, it is to be appreciated that the present invention can also consider overrides from the point of view of a sender and/or a group.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 17 schematically illustrates a representative data structure that can be employed by a computer component in connection with the subject invention.

DETAILED DESCRIPTION

Figure 1:
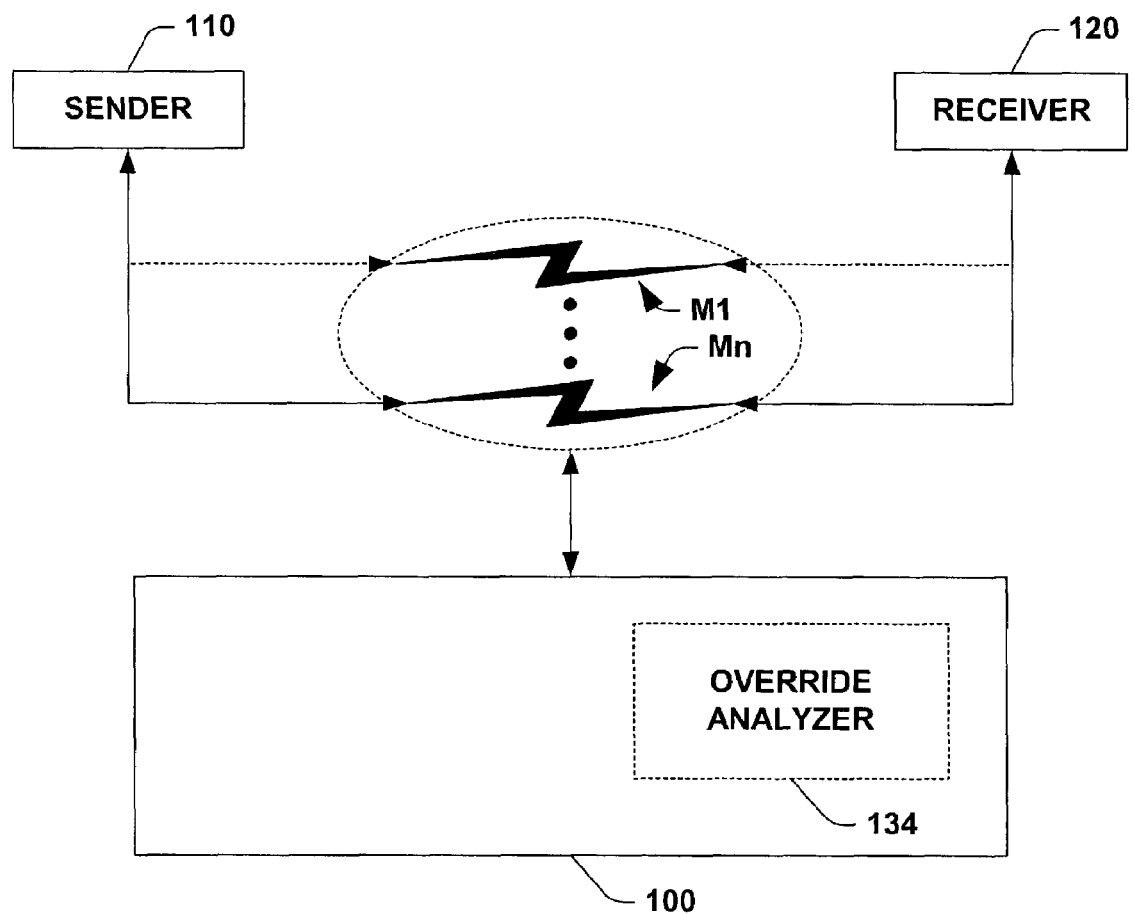
FIG. 1 schematically illustrates a system for selecting a communication channel that maximizes the utility of a communication, in accordance with an aspect of the present invention.

The present invention is now described with reference to the drawings, where like reference numerals are used to refer to like elements throughout. In the following description, for purposes of explanation, numerous specific details are set forth in order to provide a thorough understanding of the present invention. It may be evident, however, to one skilled in the art that the present invention can be practiced without these specific details. In other instances, well-known structures and devices are shown in block diagram form in order to facilitate description of the present invention.

As used in this application, the term "computer component" is intended to refer to a computer-related entity, either hardware, a combination of hardware and software, software, or software in execution. For example, a computer component can be, but is not limited to being, a process running on a processor, a processor, an object, an executable, a thread of execution, a program and a computer. By way of illustration, both an application running on a server and the server can be computer components. One or more computer components can reside within a process and/or thread of execution and a computer component can be localized on one computer and/or distributed between two or more computers.

It is to be appreciated that various aspects of the present invention employ representations of deterministic policies specified as functions or rules that take as arguments contextual information, details about the nature of the participants, and the content or task at hand. One example of the present invention also employs technologies associated with facilitating inference and decision making under uncertainty and optimization of expected utility and/or minimization of expected costs. Thus, statistical inference can be performed with models constructed by hand, from data with machine learning methods, or by a mixture of machine learning and human assessment. Such models can be used in conjunction with deterministic policies where, depending on the context, an inferential rule or deterministic rule is used.

Context can be abstracted by examining, for example, a communication sender, the relationship of the sender to a user, the time of day at which the sender is attempting to communicate, the task(s) with which the user and/or sender are engaged, the age of project(s) to which the user and/or sender are engaged, the sender and/or user location and so on. Thus, multiple attributes concerning people, including their preferences, contexts, tasks and priorities are analyzed to facilitate establishing and adapting communication policies for people in the collections.

A variety of machine learning systems/methodologies including Bayesian learning methods that search over alternative dependency structures and apply a score (such as the Bayesian Information Criteria, etc.), Bayesian classifiers and other statistical classifiers, including decision tree learning methods, support vector machines, linear and non-linear regression, and neural network representations, can be employed to build and update inferential models.

FIG. 1 illustrates a system 100 for identifying a communication channel that facilitates maximizing utility of a communication between communicating parties (e.g., sender 110, receiver 120) along that channel. An initially identified communication channel selected, for example, according to general rules and/or manually can be overridden, for example due to instant circumstances and/or specific rules. The system 100 includes an override analyzer 134. The override analyzer 134 is a computer component that determines whether the utility of a communication to be performed over an initially identified channel can be improved by employing an additional and/or alternative communication channel. Thus, a plurality of potential communication channels (e.g., channel $M_1$ through channel $M_N$, N being an integer) may have been analyzed and an initially identified communication channel may have been selected to facilitate communication between the sender 110 and the receiver 120. The override analyzer 134 determines whether the communication between the sender 110 and the receiver 120 should travel through the initially identified channel(s) or whether the communication should travel through an alternative and/or additional channel.

Thus, in one example of the present invention, the system 100 selects a communication channel that is initially believed to maximize the utility of a communication between communicating parties. The override analyzer 134 analyzes the identified communication channel and determines whether an additional and/or alternate overriding communication channel will maximize the utility of the communication. The communicating parties can be, for example, a sender 110 and a receiver 120. Although FIG. 1 illustrates one sender 110 and one receiver 120 it is to be appreciated that communications between a greater number of communicating parties can be analyzed by the present invention. Furthermore, although FIG. 1 illustrates a sender 110 and a receiver 120, it is to be appreciated that the parties to the communication may be both senders and/or receivers, human and/or machine.

By way of illustration, a human sender 110 may desire to communicate with a computer receiver 120 (e.g., online shopping site). A high graphics web site, a low graphics web site and a text based web site with which the human may communicate may initially be identified. In such an online shopping system the attentional resources of the human may be considered more important and thus the human may be presented with options to select between the initially identified channels. Additionally, and/or alternatively, the override analyzer 134 can identify an additional channel (e.g., real time telephone communication) based on an extraordinary situation (e.g., special sale for this customer for a limited period of time). Thus, in addition to and/or alternatively to being presented with the options for the initially identified channels, the human may be presented with the override choice concerning the real time phone communication with a human operator for the special sale.

The override analyzer 134 is a computer component, as that term is defined herein. In one example of the present invention, the override analyzer 134 determines whether an override should be made according to a configurable, adaptable set of rules. Such rules can be adapted over time according to human and/or machine supervision, singly, and/or in connection with adapting the rules employed to initially identify a communication channel. The override analyzer 134 rules can include rules that are operable to reason under uncertainty so that decisions can be made in the face of uncertain data. Some such rules can be decision theoretic rules.

The communication channels $M_1$ through $M_N$ can include, but are not limited to, telephone channels, computer channels, fax channels, paging channels and personal channels. Telephone channels can be employed in real time voice and/or data communications and can include, but are not limited to POTS (plain old telephone system) telephony, cellular telephony, satellite telephony and Internet telephony. By way of illustration of the operation of the system 100, the sender 110 may desire to communicate with the receiver 120 by the best telephone means possible. Thus, the sender 110 may select a "best communications available" application to select the communication channel that is predicted to maximize the utility of the communication between the sender 110 and the receiver 120. An identifier may have been programmed to analyze preferences of the communicating parties and to analyze context of the parties in identifying possible communication channels. Given the set of telephone channels described above, the identifier can determine that a real time voice communication initiated by the POTS telephone of the sender 110 and routed to the cellular telephone of the receiver 120 maximizes the utility of the communication. But the override analyzer 134 can determine, based on the very recent history of the cell phone of the receiver 130 that routing the incoming call to the satellite phone of the receiver 130 can maximize the utility. For example, while the initial identification may have examined the preferences and context of the receiver 120 and determined to route the call to the cellular phone, the override analyzer 134 may have examined one or more data values in more detail than the channel manager 132 and/or may have attributed different meaning to a piece of contextual data. Thus, the override analyzer 134 can weigh the cost of a disruption of the attention of the receiver 120 against the benefit of producing a more optimal communication and can, therefore, determine to present the receiver 120 with information concerning the initially identified channel and the suggested override channel.

In other circumstances, the override analyzer 134 can again weigh the cost against the benefit and reroute the communication without presenting the receiver 120 with information concerning the override. By way of illustration, it may initially be determined that during a certain portion of the day the receiver 120 would prefer to receive incoming communications from a certain group of individuals by POTS telephony. But at that time of day, when a call is identified from one of the individuals, the override analyzer 134 can determine that something exceptional is occurring (e.g., local POTS disruption) and thus it is more likely that the communication will be optimized via cellular telephony.

The computer channels considered by the system 100 can include, but are not limited to electronic mail (encrypted, unencrypted), collaborative editing, instant messaging, network meetings, web based calendaring and home processing devices (e.g., alarms, controls). A sender 110 may desire to communicate via a computer channel with a receiver 120. The sender 110 may therefore initiate a "best channel available" communication, which identifies an unencrypted email, an encrypted email and an instant messaging channel as the channels most likely to maximize the utility of the communication between the sender 110 and the receiver 120. But the override analyzer 134 may determine that since the receiver 120 currently has 537 unread emails (e.g., has just returned from two weeks vacation), that although an email would generally be preferred, that under the current circumstances an override may be appropriate. Thus, the override analyzer 134 can present the receiver 120 with options concerning the potential override (e.g., instant message now, instant message in five minutes, route email to cell phone, do not override) and the receiver 120 can choose between the options. Although the override analyzer 134 may have suggested an override (e.g., route the email to cell phone), the receiver 120 may be content to route the email to the already burdened email store and thus may not accept the override decision. Based on the receiver 120 choice, in one example of the present invention, the override analyzer 134 can undergo machine and/or human supervised learning, that will adapt the process(es) by which the override analyzer 134 determines whether to present override information or to make an override.

Personal channels can include, but are not limited to videoconferencing, messengering, face-to-face meeting and proxy involvement. By way of illustration, two busy executives may need to communicate privately and securely concerning an important issue (e.g., when to report expected quarterly earnings to the press). A first executive may therefore attempt to schedule a "best communication channel" communication with the second executive, specifying a personal channel as being preferred. Times for a face-to-face meeting and times for a videoconference may initially be identified. But the override analyzer 134 may determine that of all the identified channels none may reach a desired urgency preference established by the receiver 120. Thus, the override analyzer 134 may suggest that rather than attempting to schedule a face-to-face meeting or videoconference, that the first executive should communicate immediately with the trusted proxy of the second executive, and then the trusted proxy will communicate with the second executive. Thus, the communication may occur in the most time effective fashion possible without requiring the frequently nearly impossible task of rescheduling time for two busy executives.

While the examples above have illustrated the override analyzer 134 suggesting and/or routing communications within a channel (e.g., satellite telephone channel to cellular telephone channel, email computer channel to instant message computer channel), it is to be appreciated that the channel manager 132 can suggest inter-channel connections and that the override analyzer 134 can similarly consider and/or suggest inter-channel connections. By way of illustration, a sender 110 may desire to communicate with a receiver 120 by the most secure means possible. The receiver 120 may have established preferences that lead to initially identifying encrypted email, scrambled satellite telephony and trusted proxy channels. But the context of the recipient (e.g., attempting to summit Aconcagua) may have further lead the channel manager 132 to rank the satellite telephony ahead of the encrypted email and trusted proxy channels. Thus, in the absence of the override analyzer 134, the system 100 can attempt to initiate, schedule and/or calendar a communication via the satellite telephone channel. But the override analyzer 134 can analyze other data (e.g., history of communications in the last ten minutes) and/or attribute different weights to different data values (e.g., accessibility of trusted proxy to encrypted email and receiver 120). Thus, the override analyzer 134 can suggest sending an encrypted email to the trusted proxy who is in constant, secure, digitally encrypted two-way radio communication with the receiver 120.

Concerning utility of a communication, the value of a current potential communication can be evaluated by considering a measure of the history of utility of communication, attributes of the communication that can be stored as metadata (e.g., intended focus of communication, nature of communication channel, reliability of communication channel), and/or combinations thereof. Such an expected utility can be computed through the use of probabilistic models such as Bayesian networks and decision trees that provide probability distributions over outcomes based on observations or attributes associated with the communication, setting, and so on. Coupling probabilistic inference models with preferences, and employing the principles of maximum expected utility for optimization provides a useful method for computing the value of different communication actions. In one example of the present invention, utility represents communication effectiveness correlated to adherence to user preferences. Such effectiveness can be measured by factors including, but not limited to, reliability achieved on the communication channel, quantity of information content transferred, quality of information content transferred, and relevancy of information content transferred.

An expected utility function takes into consideration probability distributions over future outcomes and user preferences while reasoning under uncertainty. An example expected utility function can be calculated using:

$$E[u(d_i,c)] = s_j \in s \Sigma u(s_j,d_i)(p(s_j|d_i,c),$$

Where $p(s_j|d_i,c)$ represents the probability of achieving a future state $s_j$ given a decision $d_i$ concerning situation c, capturing communication channel parameters, nature of the contactor and a context for the contactee. Each individual outcome state $s_j \in s$ represents a possible match of preferences to related communication parameters. The function $u(s_j,d_i)$ represents the utility of state $s_j$ after the decision $d_i$ has been made.

Assume that the present invention considers two possible utilities, $U_{high}$ and $U_{low}$. Based on selecting particular communication parameters (e.g., time, media, location), the system 10 can compute $P_{high}$ and $P_{low}$, the probabilities of achieving $U_{high}$ and $U_{low}$, where $P_{high}=1-P_{low}$. Although two utility states are identified, it is to be appreciated that a greater number of utility states can be employed with the present invention. The expected utility of a decision $d_i$ is then:

$$E(d_i) = P_{high}U_{high} + P_{low}U_{low}.$$

After computing the $d_i \in D$, the system 10 can select the decision d* where $d^* = \arg\max d_i \in D\ E[u(d_i,c_j)]$, where d* represents the decision associated with maximum expected utility E.

A high utility can be associated with, for example, a large amount of valuable information being transferred. A low utility can be associated with, for example, a small amount of valuable information being transferred. Similarly, a low cost can be associated with a low drain on the attentional resources of the contactee, as might be captured by a low interruptability factor (e.g., user does not have to leave important meeting or shut down an application) and with a low amount of "hanging" (e.g., the number, type and/or importance of people and/or resources left waiting for the return of the attentional resource of the user). A high cost can be associated with a significant drain on the attentional resources of the contactee, as might be associated with an action of high interruptability (e.g., pulling a person from an important meeting) leaving many important people waiting. The utilities can take into consideration both the value and the disruptiveness of communication outcomes, combining the costs and benefits in a single assessment or explicitly breaking out the cost and benefits of the communication, and providing a means for coupling the two together (e.g., employing an additive multi-linear model, summing costs and benefits after selective weighting of the separate factors).

Utility optimization in connection with the subject invention can be based at least in part on a variety of other factors such as for example: (1) whether two or more communicating parties are concurrently engaged in a related activity; (2) whether two or more communicating parties are likely to become concurrently engaged in a related activity; (3) whether two or more communicating parties are concurrently engaged in a similar activity; (4) whether two or more communicating parties are likely to become concurrently engaged in a similar activity; (5) whether two or more communicating parties are concurrently processing one or more related documents; (6) whether two or more communicating parties are likely to concurrently process one or more related documents; (7) whether two or more communicating parties are concurrently viewing one or more related documents; (8) whether two or more communicating parties are likely to concurrently view one or more related documents; (9) whether two or more communicating parties are concurrently engaged in a shared project; (10) whether two or more communicating parties are likely to become concurrently engaged in a shared project; (11) whether two or more communicating parties are scheduled to communicate within a pre-defined period of time; (12) whether two or more communicating parties have communicated within a pre-defined period of time; (13) whether two or more communicating parties are scheduled to meet within a pre-defined period of time; (14) whether two or more communicating parties have met within a pre-defined period of time; (15) whether a communicating party has engaged in one or more pre-defined activities of interest within a pre-defined period of time; (16) whether a communicating party is likely to engage in one or more pre-defined activities of interest within a pre-defined period of time; (17) whether a communicating party has purchased one or more pre-defined items of interest; (18) whether a communicating party has registered an interest in one or more pre-defined items of interest; (19) the degree to which a communicating party is trusted by one or more other communicating parties.

It is to be appreciated that the aforementioned list of factors that can be employed in connection with the subject invention can be considered individually or a subset of the factors considered concurrently. Moreover, it is understood that the above list is merely exemplary and should not be considered exhaustive of the variety of factors that could be considered in connection with facilitating utility optimization in connection with the subject invention.

Figure 2:
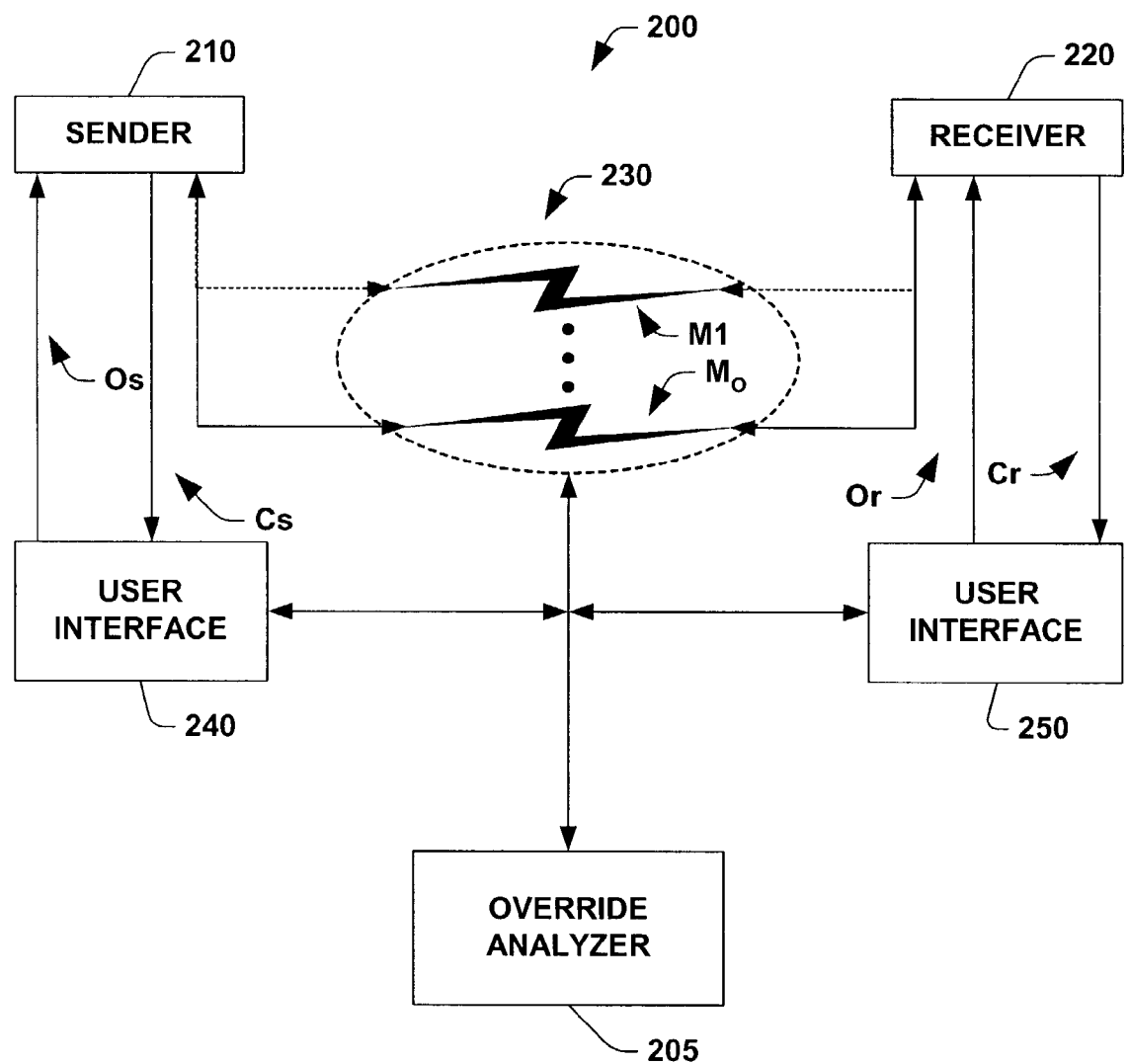
FIG. 2 schematically illustrates a system for identifying an over-rideable, utility maximizing communication channel, where the system includes a user interface, in accordance with an aspect of the present invention.

FIG. 2 illustrates an override system 200 that includes an override analyzer 205 for identifying a utility maximizing communication channel employed for a communication between a sender 210 and a receiver 220. The override analyzer 205 analyzes a plurality 230 of potential communication channels that can be employed to facilitate communications between the sender 210 and the receiver 220. For example, if the plurality 230 includes communication channels $M_1$ through $M_O$, O being an integer, an initially identified channel can be employed and/or considered for the communication to facilitate maximizing the utility of the communication based on the preferences and/or contexts of the sender 210 and the receiver 220. But, before and/or during the communication, the override analyzer 205 can determine that a different channel(s) can improve the utility of the communication. Thus, an override is appropriate and the channel(s) will be switched and/or information concerning the override will be presented to the sender 210 and/or receiver 220.

Thus, one or more options $O_S$ may be presented to the sender 210. Similarly, one or more options $O_R$ may be presented to the receiver 220. The options $O_S$ and/or $O_R$ may include, but are not limited to, the communication channels initially identified and override information generated by the override analyzer 205. By way of illustration, if the attentional capital of the sender 210 is considered more important than that of the receiver 220, and if four possible meeting times that would likely maximize the utility of the communication were initially identified, then the sender 210 may be presented, in the options $O_S$, information concerning those four meeting times. Similarly, if the attentional capital of the receiver 220 is considered more important than that of the sender 210, then the four meeting times may be presented to the receiver 220 in the options $O_R$. Attentional capital is but one example factor that can be analyzed by the system 200 and/or the override analyzer 205. Other factors include, but are not limited to, interruptability, hanging resources and set up requirements.

Additionally, and/or alternatively, if the override analyzer 205 determines that an override is appropriate, then the options $O_S$ and/or $O_R$ can be augmented and/or replaced by override information. Thus, in addition to the four meeting times, a communicating party may be presented with information that the override analyzer 205 has determined has sufficient significance that extra demands on the attentional capital (and/or other analyzed factors) of the communicating party(s) are warranted. Since communicating parties may have different desires to customize their communication systems, the override analyzer 205 may be configured to facilitate the communicating party(s) being presented with a greater or lesser number of override suggestions.

Having been presented with the options $O_S$ and/or $O_R$, the sender 210 and/or receiver 220 may respond to the options by making one or more choices and communicating those choices $C_S$ and/or $C_R$ to the override analyzer 205. By way of illustration, if the sender 210 was presented with the four meeting times and override information in the options $O_S$, the sender 210 may select one of the four initial times or may react to the override information and communicate such choice or reaction via the $C_S$. Based, at least in part, on the choice information conveyed in the $C_S$, the override analyzer 205 may then select from the set of four meeting times and/or the override choice(s).

Additionally, the override analyzer 205 can be adapted in response to the choice information conveyed in the $C_S$ and/or $C_R$. By way of illustration, rules employed by the override analyzer 205 can be adapted. For example, a rule that considers the preferences and the context of the communicating parties may be changed to rebalance the relative weight assigned to the preferences of the sender 210 as compared to the preferences of the receiver 220. In another example, a rule that weights deterministic data more heavily than data inferred through decision theoretic formula(e) can be updated to validate the reasoning performed under uncertainty. In addition to the rules for selecting a channel, processing associated with determining whether override information should be presented can also be updated. Thus, in response to $C_S$ and/or $C_R$, the override analyzer 205 can increase, decrease and/or maintain the initially configured threshold for presenting override information. Furthermore, in response to $C_S$ and/or $C_R$, the override analyzer 205 can increase, decrease and/or maintain the initially configured threshold for an automatic override (e.g., without presenting override information). Such update processing can be performed through human supervision and/or machine learning.

In one example of the present invention, the override analyzer 205 includes an override determiner that determines whether an initially identified communication channel should be overridden by the additional and/or alternate communication channel. The override determiner can therefore identify the additional and/or alternative communication channel(s) and establish a communication along that additional and/or alternative channel(s). In the example system, the override analyzer 205 also includes an override interface that presents a communicating party with override information concerning whether the identified communication channel should be overridden. The override interface receives a response from the communicating party concerning the override information that facilitates determining whether the initially identified communication channel should be overridden. Any suitable interface scheme can be employed as part of the override interface (e.g., haptics—a computer-controlled mechanism designed to detect motion of a human operator without impeding that motion, and to feed back forces from a teleoperated robot or virtual environment). It is to be appreciated that the override system 200 can be employed in the system 100 (FIG. 1).

Figure 3:
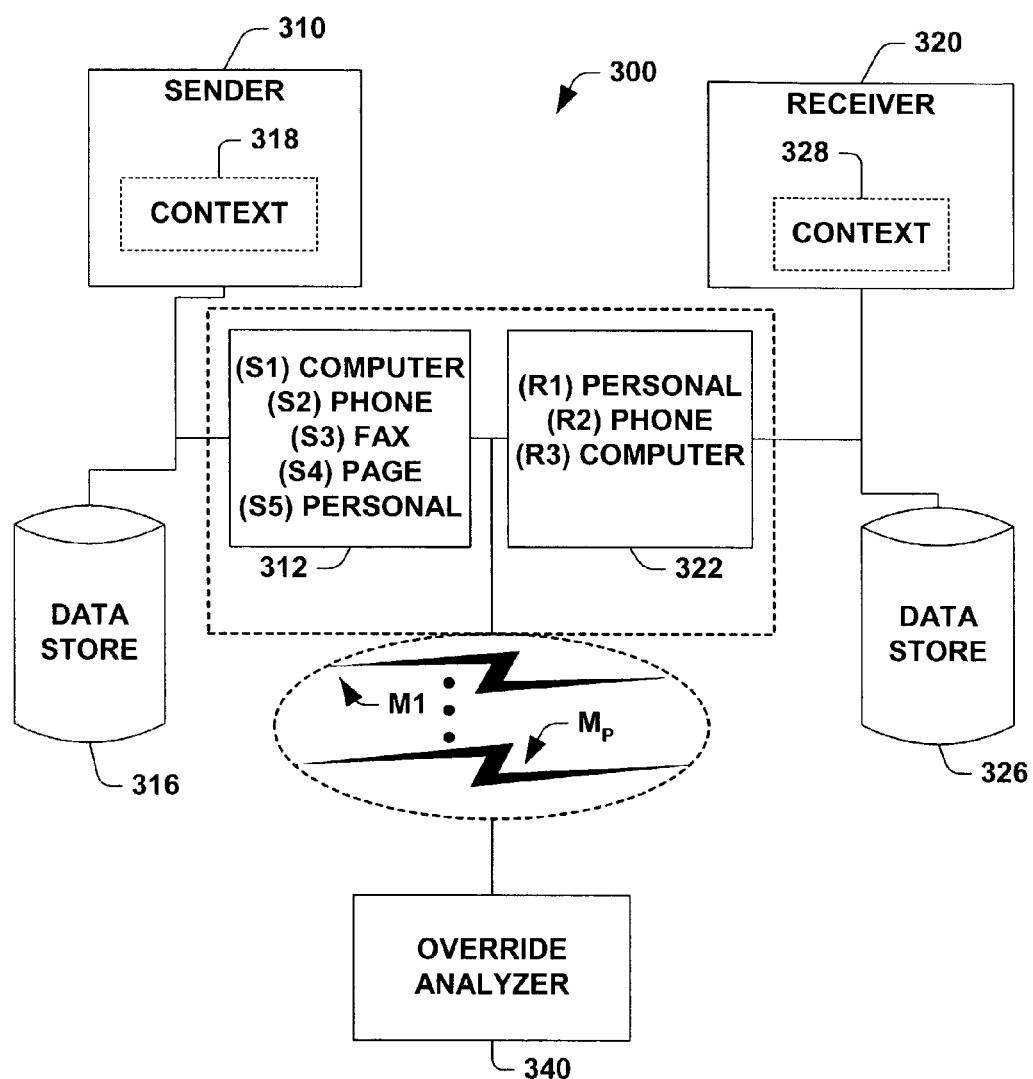
FIG. 3 is a schematic block diagram illustrating a system for identifying a utility maximizing communication channel based, at least in part, on the context, preferences and capabilities of the communicating parties, in accordance with an aspect of the present invention.

FIG. 3 illustrates a system 300 for identifying a utility maximizing communication channel based, at least in part, on diverse contexts, preferences and capabilities of the communicating parties. In FIG. 3, one communicating party, the sender 310, has available five channels 312 (e.g., $S_1$ through $S_5$) that include a computer channel $S_1$, a phone channel $S_2$, a fax channel $S_3$, a page channel $S_4$ and a personal channel $S_5$. The five channels $S_1$ through $S_5$ are ranked according to the preferences of the sender 310, where such preference data can be stored in a sender data store 316, for example. While five channels are illustrated, it is to be appreciated that a greater and/or lesser number of channels can be analyzed by the present invention and that different communicating parties may prefer to communicate via channels ranked in different orders. Information concerning the available channels can be stored, for example, in the sender data store 316. Information concerning the context of the sender 310 can be stored in a sender context data store 318. Preference data can include, but is not limited to, preferences concerning the time of day for communicating, the time of the week for communicating, preferred communicating parties, preferred hardware, preferred software and preferred interruptability. The context data can include, but is not limited to, hardware data, software data and observed data. Preference and context data will be discussed further in connection with FIG. 14 and other figures.

Similarly, the receiver 320 has available three channels 322 (e.g., $R_1$ through $R_3$) that include a personal channel $R_1$, a phone channel $R_2$ and a computer channel $R_3$ that are ranked according to the preferences of the receiver 320. Such preferences can be stored, for example, in the receiver data store 326. Again, similar to the context of the sender 310, the context of the receiver 320 can be stored in a context data store 328. Given the five available channels $S_1$ through $S_5$, the context 318, the data stored in the data store 316, the three channels $R_1$ through $R_3$, the context 328 and the data stored in the data store 326, an initial identification of the channel and/or combination of channels $M_1$ through $M_P$ that are expected to maximize the utility of the communication between the sender 310 and the receiver 320 can be made. Such initial identification can be made by, for example, a user and/or a channel manager.

The utility of the communication can be evaluated according to formulae that consider the cost of the communication and the value of the communication as viewed from the points of view of both a sender and a receiver. An exemplary formula can take the form:

utility=$u(\text{cost}_S, \text{value}_S, \text{cost}_R, \text{value}_R)$,

The utility calculations may weight the costs and/or benefits to the contactors and/or contactees differently. By way of illustration, the value can be computed via a combination function f of other functions g and h that operate separately on the costs and the benefits to the contactor (the sender) and the contactee (recipient of the initial communication) as follows:

utility=$f(g[(\text{value}_S*w1),(\text{cost}_S*w3)],h[(\text{value}_R*w2),(\text{cost}_R*w4)])$.

By way of further illustration, consider a case where the value is a function of the difference of the costs and the benefits to the contactor and the contactee, as follows:

utility=$f([(\text{value}_S*w1)-(\text{cost}_S*w3)], [(\text{value}_R*w2)-(\text{cost}_R*w4)])$.

One example of such a difference function employs a multi-linear weighted combination of the separate terms for contactee and contactor, utility=$w_S[(\text{value}_S*w1)-(\text{cost}_S*w3)]+w_R[(\text{value}_R*w2)-(\text{cost}_R*w4)])$.

For such a formulation, diminishing $w_S$ to zero, removes the preferences of the contactor, and makes communication decisions depend on the preferences of the contactee. Diminishing $w_R$ to zero, makes communication decisions depend on the preferences of the contactor. Such adjustments to the weights, which can lead to diminutions and/or enhancements of the relative importance of the contactor and/or contactee costs and/or benefits. Similarly, weights can be affected by context (e.g., time, location, activity).

The cost to the sender ($\text{cost}_S$) can be analyzed by examining a set of cost factors $\text{cost}_S=\{a, b, c, \ldots\}$ that can include, but are not limited to, the cost of making a connection instantly, the cost of making a connection at a later time, the cost of employing a particular channel and/or set of channels and the cost of not making a connection, where the costs may include actual costs and/or expected costs. Such costs can be measured by actual and/or opportunity cost in time, communication resources and/or human resources.

The value to the sender (values) can also be analyzed by examining a set of value factors values $\{m, n, o, \ldots\}$ that can include, but are not limited to, the value of making an instant connection, the value of making a later connection and the value of employing a particular channel and/or set of channels, where the values can include actual values and/or expected values. The values can similarly be measured by actual and/or opportunity cost of time, communication resources, dollars, and/or human resources. The expected costs and/or expected values can be computed through deterministic processing and/or reasoning under uncertainty.

The cost to the receiver ($\text{cost}_R$) can be analyzed by examining a set of cost factors $\text{cost}_R=\{x, y, z, \ldots\}$ that can include, but are not limited to, the cost of making a connection instantly, the cost of making a connection at a later time, the cost of employing a particular channel and/or set of channels and the cost of not making a connection, where the costs can include actual costs and/or expected costs. Such costs and/or values can be measured by actual cost in time, money, human resources, and/or opportunity cost in time, money, human resources and/or communication resources, for example.

The value to the receiver ($\text{value}_R$) can also be analyzed by examining a set of value factors $\text{value}_R=\{p, q, r, \ldots\}$ that can include, but are not limited to, the value of making an instant connection, the value of making a later connection and the value of employing a particular channel and/or set of channels, where the values can include actual values and/or expected values. The expected costs and/or expected values can be computed through reasoning under uncertainty. The costs can vary over time, thus, a first set of costs $\text{cost}_S T_0$ computed for a first time $T_0$ may not be equal to a second set of costs $\text{cost}_S T_1$ computed for a second time $T_1$. Similarly, the values can vary over time and a first set of values $\text{value}_S T_0$ may not be equal to a second set of values $\text{value}_S T_1$. Thus, rather than producing a single value, the systems described thus far and described in more detail below can produce a set of expected utilities for the communications via a plurality of communication channels.

While the initial identification can analyze the costs and values in one manner using, for example, utility functions, the override analyzer 340 can analyze the costs and values in other manners, and thus can analyze different data points and/or assign greater weight to different data points than those initially analyzed. Furthermore, the override analyzer 340 can employ formulae that are more responsive to instant conditions than formulae employed in the initial identification. Such override analyzer 340 formulae can be programmed to respond to more general conditions with less weight on instant conditions. Thus, although an initial identification may be based on the expected utilities that are computed based, at least in part, on the available channels, the context and the preferences of the communicating parties, the override analyzer 340 can determine that a communicating party should be presented with information concerning overriding the channel initially selected. Such information may be presented before and/or during the communication by interfaces that include graphical interfaces, audible interfaces and haptic interfaces (e.g., interfaces that employ the sense of touch).

While FIG. 3 illustrates a sender 310 and a receiver 320, it is to be appreciated that communications between more than two communicating parties can be analyzed by the present invention. It is to be further appreciated that the sender 310 and the receiver 320 can be human and/or machine and may have a variety of communication channels available to them.

Figure 4:
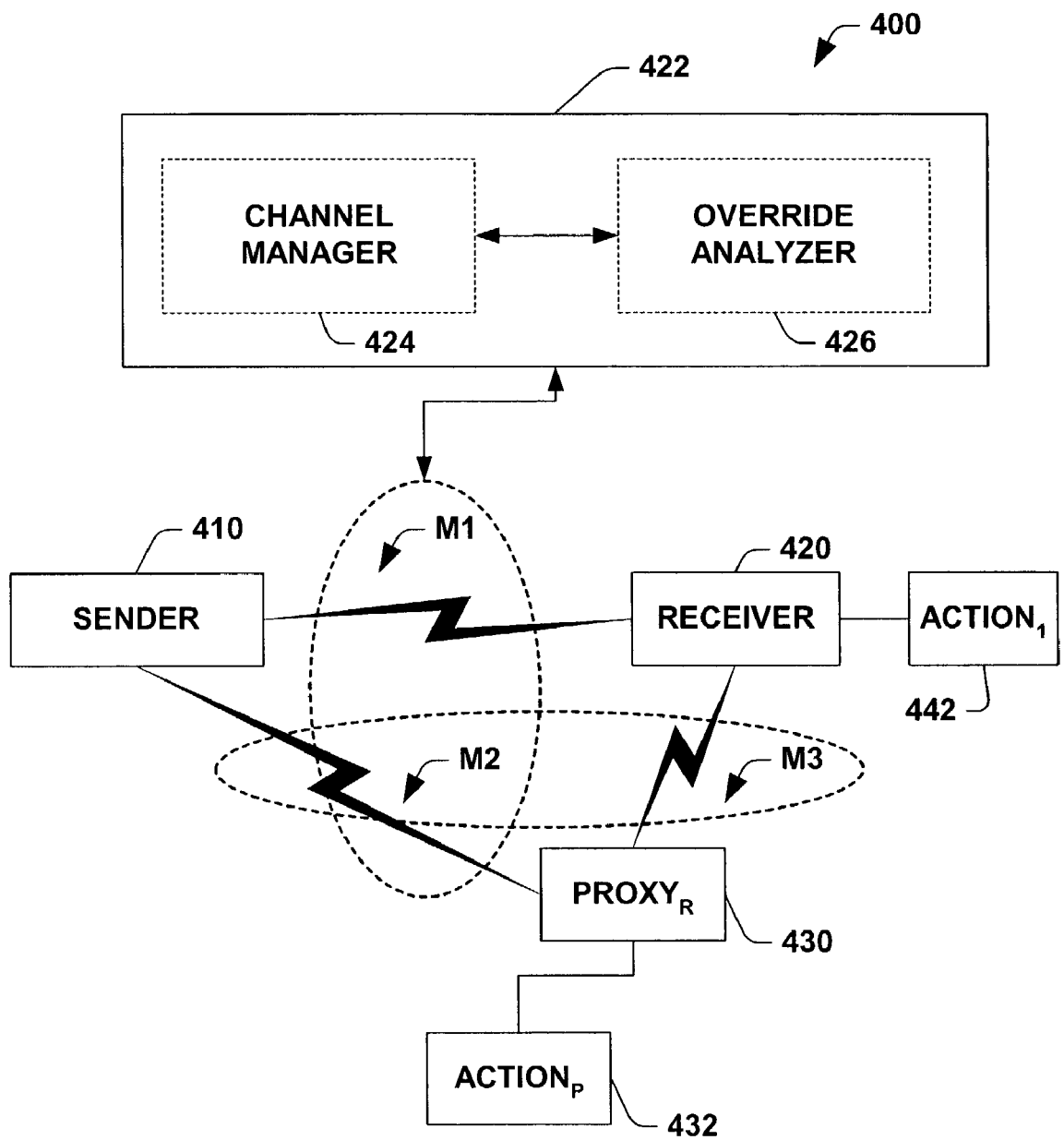
FIG. 4 illustrates a communication routed through a proxy in accordance with an aspect of the present invention.

FIG. 4 illustrates a system 400 that facilitates routing a communication through a proxy. A sender 410 may desire to communicate with a receiver 420. A channel selecting system 422, which can include a channel manager 424 and an override analyzer 426, can, by operation of the channel manager 424 and/or manually and/or by other means, identify a channel M1 that is predicted to maximize the utility of the communication between the sender 410 and the receiver 420. But the override analyzer 426 can identify a channel M2 that involves a communication between the sender 410 and a proxy for the receiver 420 proxy$_R$ 430. The override analyzer 426 can determine that a communication between the sender 410 and the proxy$_R$ 430 can facilitate the proxy$_R$ 430 performing an action actions 432 (e.g., communicating with the receiver 420 via channel M3, retrieving the information sought by the sender 410) that will produce a higher expected utility for the communication. By way of illustration, the goal of the communication from the sender 410 to the receiver 420 can be to have the receiver 420 perform an action action$_1$ 442 like retrieving a piece of information (e.g., current flight information). But the channel manager 424 may be unaware of information that is available to the override analyzer 426. Thus, the override analyzer 426 maycan determine that the proxy$_R$ 430 (e.g., receiver 420 personal assistant) maycan be able to more efficiently retrieve the flight information, and thus may automatically initiate, schedule and/or calendar the communication between the sender 410 and the proxy$_R$ 430 via the channel M2.

Figure 5:
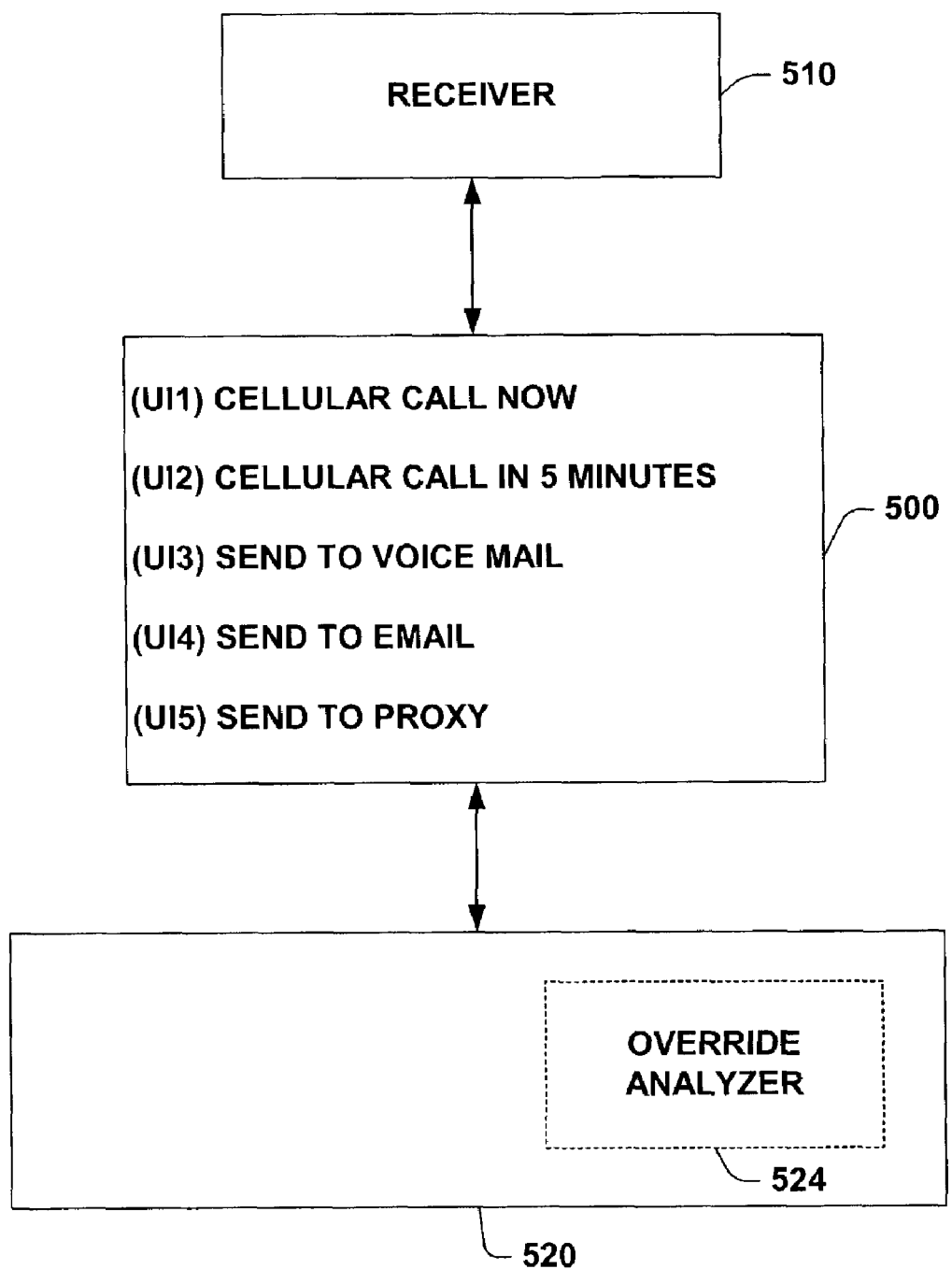
FIG. 5 illustrates a sample user interface employed in accordance with an aspect of the present invention.

FIG. 5 illustrates a sample user interface 500 that can be employed with the present invention. While one receiver 510 is illustrated, it is to be appreciated that one or more receivers 500 and/or other communicating parties may be presented with information via the user interface 500. The user interface 500 may receive information concerning options to present to the receiver 510 from a channel choosing system 520 that includes an override analyzer 524. It is to be appreciated that the interface 500 can present information in methods including, but not limited to, visual methods, tactile response methods and/or audible methods. Such visual methods can include, for example, computer display, cellular telephone display, PDA display, pager display, and the like. The audible methods can include, for example, telephony presentation and computer animated voice presentation. The tactile response methods include, for example, vibrating a pager.

The user interface 500 can present the receiver 510 with one or more options. By way of illustration, the user interface 500 can present a receiver 510 with five options (e.g., UI1 cellular call now, UI2 cellular call in five minutes, UI3 send to voice mail, UI4 send to email, and UI5 send to proxy). Some choices may come from the override analyzer 524 while other choices may have been generated by other means (e.g., manually, channel manager). For example, the override analyzer 524 may have identified only the proxy channels. The override analyzer 524 can determine that current cellular conditions (e.g., radio interference, location) and computer conditions (e.g., network load) warrant presenting information associated with an override (e.g., communicating via the proxy). Thus, mixed and/or multiple communication channels can be identified and/or selected.

In one example of the present invention, the option information is presented in a manner that distinguishes options identified by the override analyzer 524. By way of illustration, options identified by the override analyzer 524 can be displayed in a distinct font and/or color. By way of further illustration, options identified by the override analyzer 524 can be presented in a distinct voice (e.g., urgent male voice).

In response to the information presented by the user interface 500, the receiver 510 can make one or more choices. Such choices can be employed to determine which channel(s) should be employed to make and/or maintain a connection, and such choices can also be employed as feedback in machine learning. For example, if the receiver 510 is presented with the choices UI1 through UI5, where UI1 through UI4 were chosen by a channel manager and UI5 was chosen by the override analyzer 524, and the receiver 510 selects UI5, then the channel manager and/or the override analyzer 524 can be adapted, by machine and/or human supervised learning, to alter the manner in which choices are made and/or the manner in which a determination is made to present override information. Such adaptation can include adjusting a threshold that was initially established by a user of the system that controls whether override information should be presented. By way of illustration, rules that were employed to present a rejected override suggestion can be adapted to reduce the likelihood that a similar suggestion is presented while rules that were employed to present an accepted override decision can be adapted to increase the likelihood that a similar suggestion will be presented.

Thus, in one example of the present invention, a computer system will have a graphical user interface (GUI) that includes a display and a selection device. The GUI is employed in a method of providing choices via a menu on a display, selecting from the menu on the display, and acting in response to a selection. The method includes retrieving a first set of menu entries for the menu, where each of the menu entries represents an initially identified communication with a calculated expected utility and displaying the first set of menu entries on the display. The method further includes retrieving a second set of menu entries for the menu where each of the menu entries represents a potential overriding communication with a calculated expected utility and displaying the second set of menu entries on the display. Once the menu entries are displayed, the method receives a menu entry selection signal indicative of the selection device selecting a selected menu entry from the first set and second set of menu entries and in response to the menu entry selection signal, initiates a communication represented by the menu entry.

Figure 6:
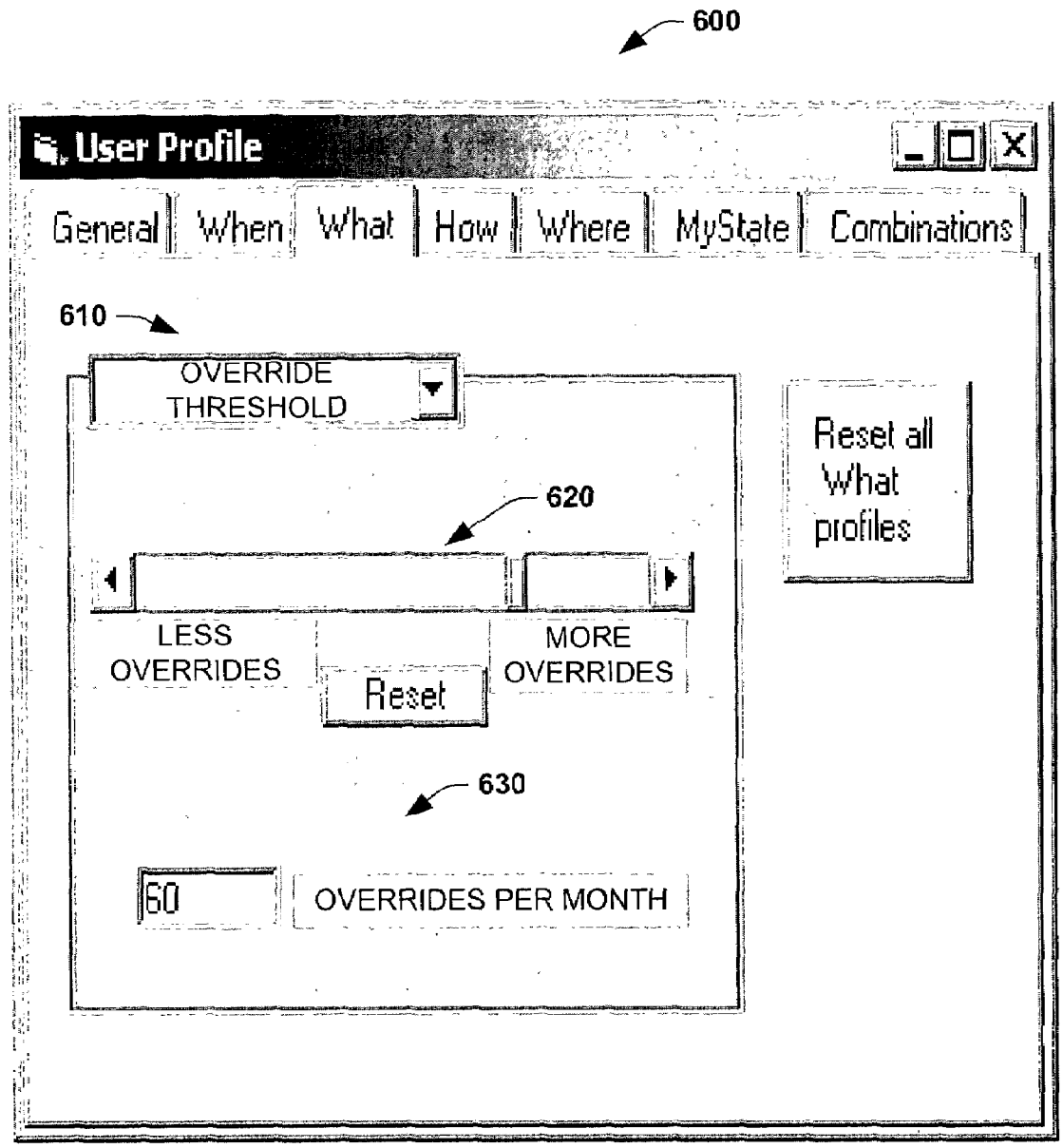
FIG. 6 illustrates a sample user interface employed in accordance with an aspect of the present invention.

FIG. 6 illustrates a portion of a sample user interface 600 that can be employed to configure the present invention. The interface 600 includes a dialog box 610 for identifying a parameter to be configured. FIG. 6 illustrates an override threshold in the dialog 610. Thus, a slider 620 can be positioned to configure whether a communicating party desires to receive relatively more or relatively less override suggestions. For example, text box 630 indicates that at the current position of the slider 620 that an average of 60 override suggestions per month may be presented. Such a number may be configured during early training of a system for presenting overrides to a communicating party, and such a number may subsequently be adjusted by machine and/or human learning and/or reconfiguration. By way of illustration, after a statistically meaningful number of communications (e.g., 1000) and suggested overrides (e.g., 100) have been presented to a communicating party, the communicating party may determine that too many override suggestions are being presented, and thus may employ the interface 600 to reduce the likelihood of receiving such suggestions. By way of further illustration, after a statistically meaningful number of communications (e.g., 2500) and suggested overrides (e.g., 250) have been presented to a communicating party, a machine learning computer component may analyze the suggested overrides and the responses to the suggested overrides and determine that a large percentage (e.g., 75%) of the override suggestions are being accepted, and therefore the number of overrides per month should be increased. While sliders, text boxes, tabs and buttons are illustrated in FIG. 6, it is to be appreciated that additional and/or alternative graphical user interface (GUI) elements may be employed in configuring the present invention.

Figure 7:
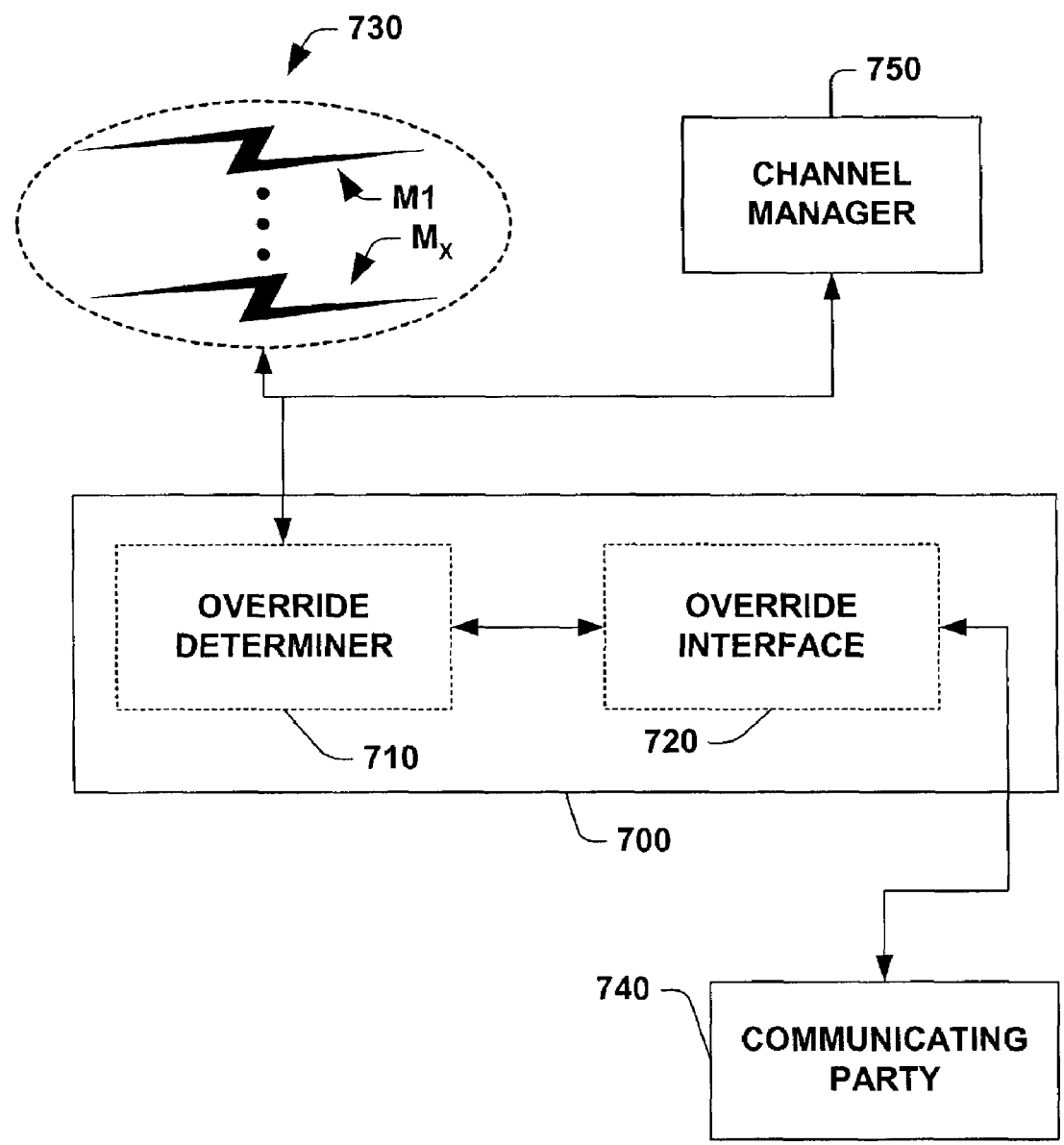
FIG. 7 is a schematic block diagram illustrating a system for overriding the choice of a communication channel that maximizes the utility of a communication, in accordance with an aspect of the present invention.

FIG. 7 illustrates a system 700 for determining whether an override should occur and for presenting information concerning a potential override. The system 700, which may be a computer component as that term is defined herein, may include both an override determiner 710 and an override interface 720. The override determiner 710 can be employed, for example, to examine a plurality 730 of communication channels (e.g., channel $M_1$ through $M_X$), to determine whether one or more of the channels may be more likely to maximize the utility of a communication than a channel(s) initially identified by a channel manager 750. The channels can include, but are not limited to, phone channels, computer channels, fax channels, human/personal channels and the like. The override interface 720 may present to a communicating party 740 information concerning the decision of the override determiner 710, either that an override was considered and presented, or that an override was considered and not presented. Thus, reactions by the communicating party 740 to either an override that was considered and not presented, or to an override that was considered and presented, can be employed to adapt the system 700 to more accurately respond to the preferences and/or context of a communicating party. It is to be appreciated that the communicating party 740 can be a human and/or a computer, and that although a single communicating party 740 is illustrated, that the override interface 720 can present information to a greater number of communicating parties.

In FIG. 7, a channel manager 750 and the system 700 are illustrated as separate computer components. Thus, it is to be appreciated that a channel manager may be employed with the present invention. For example, the channel manager 750 may be implemented on a centralized communication system supported by a communications carrier while the system 700 may be implemented on individual communication devices that interact with the centralized communication system. Thus, the system 700 may be able to more accurately, quickly and/or thoroughly react to instant conditions than the channel manager 750, which can lead to the override determinations. However, it is to be appreciated that the channel manager 750 and the system 700 may be implemented as a single computer component. It is to be further appreciated that the system 700 can be employed in the system 100 (FIG. 1).

Figure 8:
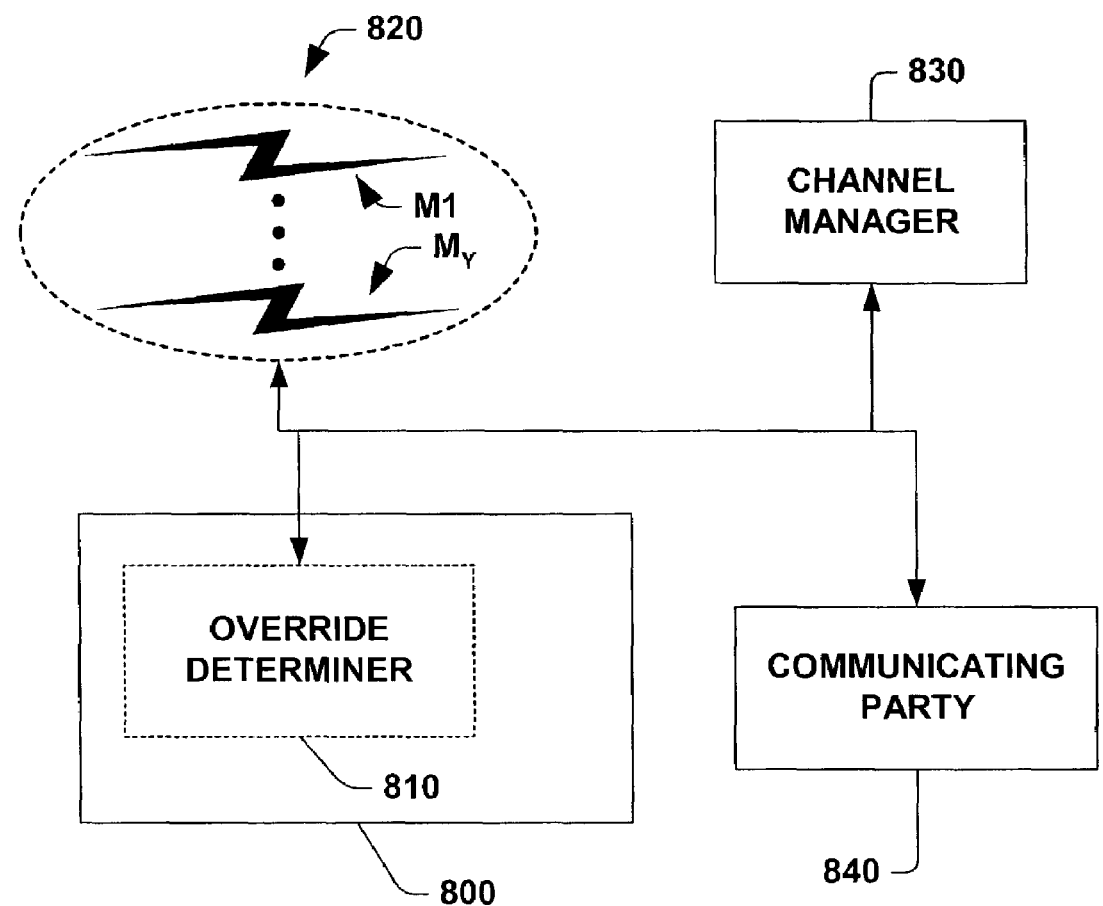
FIG. 8 is a schematic block diagram illustrating a system for overriding the choice of a communication channel that maximizes the utility of a communication, in accordance with an aspect of the present invention.

FIG. 8 illustrates a system 800 for determining whether an override should occur. The system 800, which may be a computer component as that term is defined herein, does not include a component for presenting information concerning a potential override. An override determiner 810 may examine, for example, a plurality 820 of communication channels (e.g., channel $M_1$ through $M_Y$), to determine whether one or more of the channels may be more likely to maximize the utility of a communication than a channel(s) initially identified, for example, by a channel manager 830. However, rather than presenting information concerning an override decision and/or override options, the system 800 may automatically perform an override, and thus the communicating party 840 may never be aware that the override occurred. It is to be appreciated that the communicating party 840 can be a human and/or a computer, and that although a single communicating party 840 is illustrated, that the override determiner 810 can perform overrides for a greater number of communicating parties. It is to be further appreciated that the override may occur before and/or during the communication.

The channel manager 830 and the system 800 are illustrated as separate computer components. Thus, it is to be appreciated that the present invention can be employed with a channel manager and/or independent of a channel manager. For example, the channel manager 830 may be implemented as cooperating computer components resident on a number of systems that supply communication channels while the system 800 may be implemented on individual communication monitoring devices. Thus, the system 800 may be able to more accurately, quickly and/or thoroughly react to instant conditions than the channel manager 830, which can lead to the override determinations. However, it is to be appreciated that the channel manager 830 and the system 800 may be implemented as a single computer component. It is to be further appreciated that the system 800 can be employed with the system 100 (FIG. 1).

Figure 9:
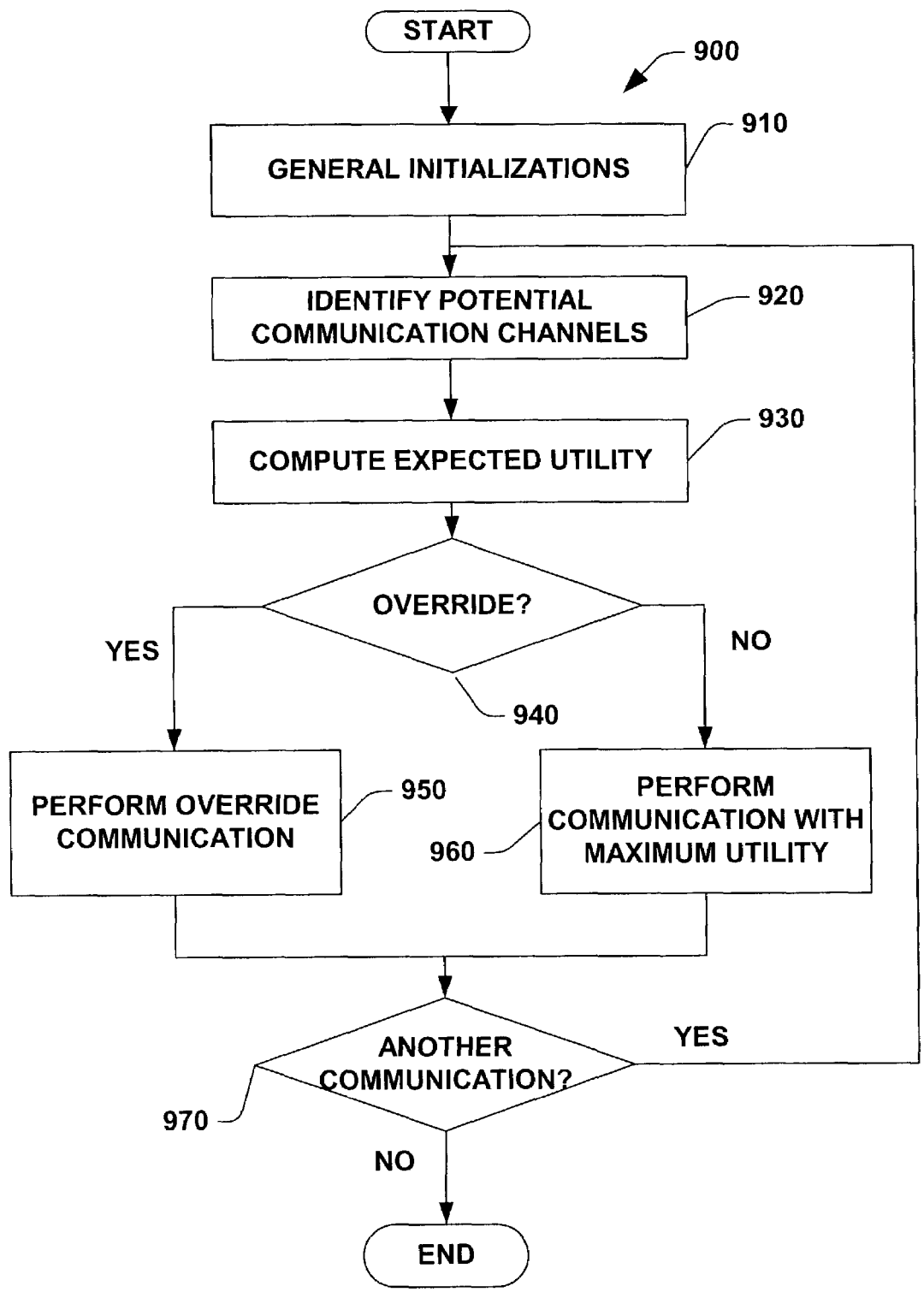
FIG. 9 is a flow chart illustrating a method for identifying a communication channel that maximizes the utility of a communication, where the choice of communication channel can be overridden, in accordance with an aspect of the present invention.
Figure 10:
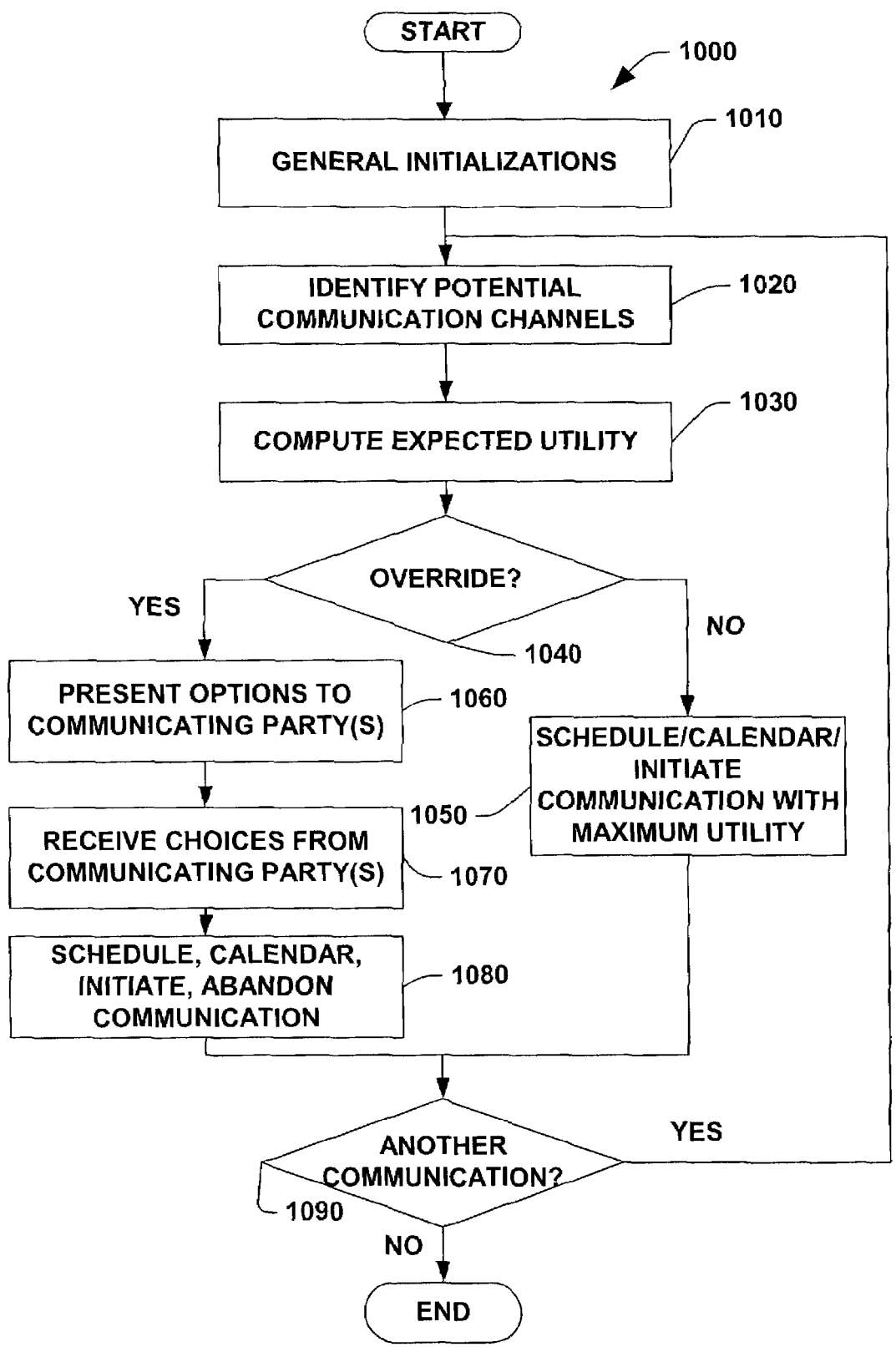
FIG. 10 is a flow chart illustrating a method for identifying an over-rideable, utility maximizing communication channel, in accordance with an aspect of the present invention.
Figure 11:
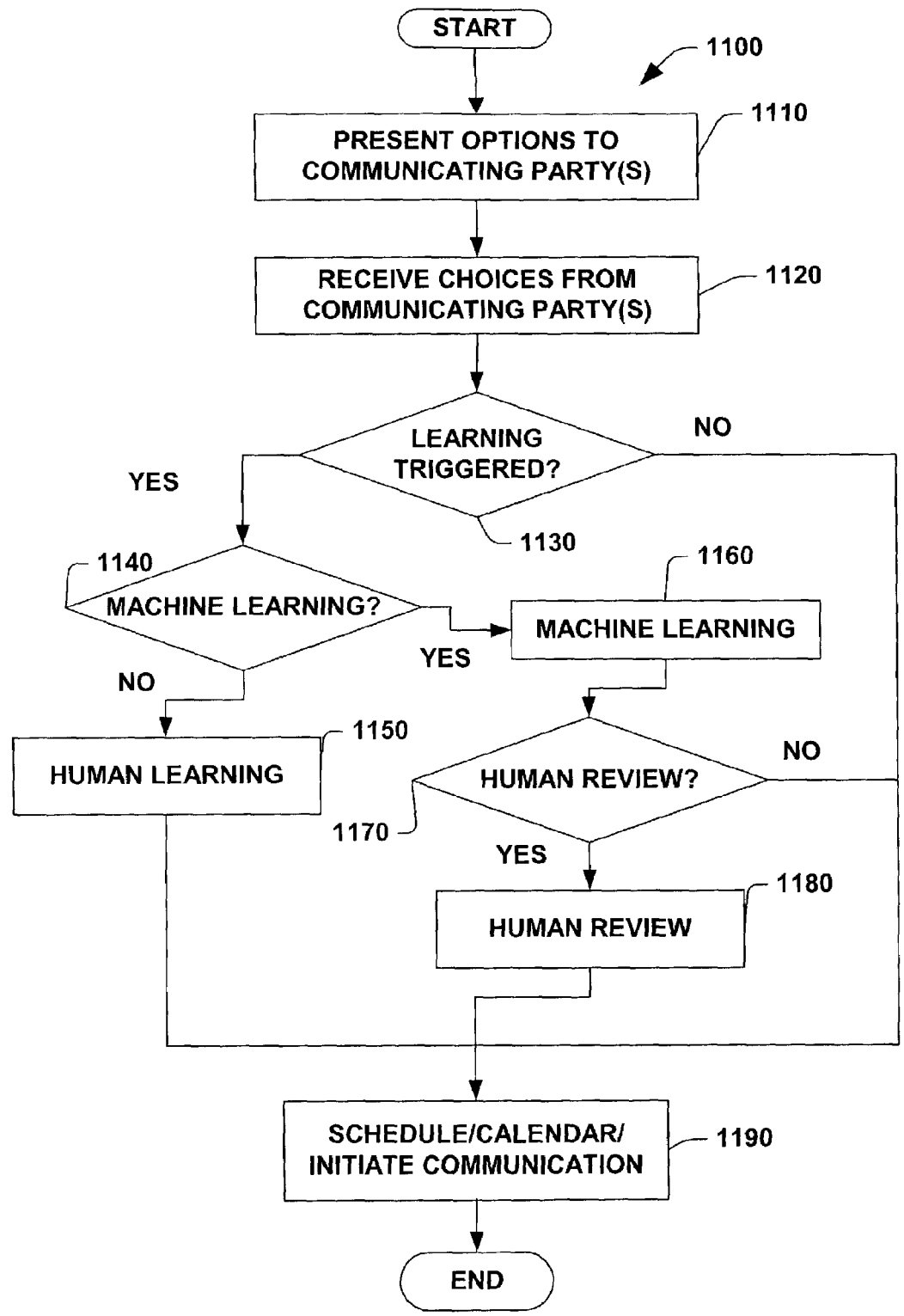
FIG. 11 is a flow chart illustrating a method for performing machine and/or human learning to adapt a system for identifying a communication channel that maximizes the utility of a communication, in accordance with an aspect of the present invention.

In view of the exemplary systems shown and described above, methodologies, which may be implemented in accordance with the present invention will be better appreciated with reference to the flow diagrams of FIGS. 9 through 11. While for purposes of simplicity of explanation, the illustrated methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention. Furthermore, additional and/or alternative methodologies may employ additional blocks, not illustrated herein. In one example of the present invention, such methodologies can be implemented as computer executable instructions that can be stored on computer readable media.

FIG. 9 illustrates a method 900 for initially identifying communication channels that are predicted to maximize the utility of a communication and for potentially overriding the decision to employ such initially identified communication channels. At 910, general initializations occur. Such initializations can include, but are not limited to, allocating memory, establishing pointers, establishing data communications, acquiring resources, setting variables and displaying process activity. At 920, potential channels that are available or that may become available to connect communicating parties are identified. Such identification may be performed by methods including, but not limited to, manual means and channel manager means. Such channels can include but are not limited to phone, computer, fax, pager, and/or human (e.g., proxy) channels. At 930, the expected utility for the potential channels is computed. Such utility may be computed according to a variety of utility functions that consider both deterministic and uncertain data.

At 940, a determination is made concerning whether an override is appropriate. For example, if the set of expected utilities does not yield a clear winner (e.g., a channel with a ten percent higher expected utility than any other utility and an expected utility higher than a desired threshold), then a decision may be made to override the communication with the greatest expected utility and to employ a different communication channel that maximizes some other parameter (e.g., convenience, security) or that minimizes some other parameter (e.g., delay, cost).

If the determination at 940 is YES, then at 950, a communication may be established between communicating parties via a channel(s) identified in accordance with override processing. But if the determination at 940 is NO, then at 960 the communication channel(s) initially identified with the highest expected utility may be employed to establish the communication.

At 970, a determination is made concerning whether there is another communication to process. If the determination at 970 is YES, then processing can return to 920, otherwise processing can conclude.

FIG. 10 illustrates a method 1000 for initially identifying communication channels that are predicted to maximize the utility of a communication and for potentially overriding such initially identified communication channel decisions based on communicating party(s) interactions with user interface information. At 1010, general initializations occur. Such initializations can include, but are not limited to, allocating memory, establishing pointers, establishing data communications, acquiring resources, setting variables and displaying process activity.

At 1020, potential channels that are available or that may become available to connect communicating parties are identified. At 1030, the expected utility for the potential channels is computed. Such utility calculations may consider both deterministic and uncertain data, and thus the expected utilities may be produced in forms that include probability ranges and/or distributions.

At 1040, a determination is made concerning whether an override is appropriate. For example, if the expected utilities do not rise to a desired value then an override may be appropriate. By way of illustration, if the communication channels have expected utilities of less than fifty percent, then the value of such communications may be so low that it is worthwhile to interrupt the communicating parties and to provide them with the additional attentional distraction of examining and selecting between override choices. Thus, if the determination at 1040 is NO, then at 1050 communication(s) employing the initially identified channel(s) may be employed to connect the communicating parties. But if the determination at 1040 is YES, then processing can proceed to 1060.

At 1060, override options may be presented to communicating parties. For example, if the expected utilities from 1030 were associated with a first set of channels, then information concerning the expected utility and/or other information (e.g., time, cost) concerning a second set of channels, which may be independent from the first set of identified channels and/or that can include a subset of the first set of channels, may be presented to one or more communicating parties. At 1070, choices concerning the options presented at 1060 can be received from the communicating party(s). For example, the communicating party(s) may decide to accept the override decision, in which case, at 1080, a communication that employs the override channel will be scheduled/calendared/initiated. But the communicating party(s) may reject the override information, choosing instead the initially identified channels and/or to not proceed with communications.

At 1090, a determination is made concerning whether there is another communication to process. If the determination at 1090 is YES, then processing can return to 1020, otherwise processing can conclude.

FIG. 11 illustrates a method 1100 for adapting processing performed in association with identifying communication channels and/or determining when and/or how to override a decision concerning a communication channel. At 1100, channel options are presented to a communicating party(s). For example, information concerning communication channels identified by means including, but not limited to, manual means and a channel manager and/or communication channels identified by an override analyzer can be presented to the communicating party(s). Such channels can include, but are not limited to, telephone channels, computer channels, proxy channels and the like. The options presented to the communicating party(s) can include, but are not limited to, "accept" the option, "reject" the option, "always provide this option" and "never provide this option again". Thus, at 1120, the method receives the choices from the communicating party(s) in response to the options presented at 1110. The choices from the communicating party(s) can include, but are not limited to, accepting an option, rejecting an option, categorically requiring an option and categorically denying an option.

At 1130, a determination is made concerning whether the choices of 1120 made in response to the options of 1110 have triggered learning. By way of illustration, if a communicating party has accepted a pre-determined, configurable number of override suggestions, then learning designed to reinforce the processing that presented such accepted override suggestions may be triggered. By way of further illustration, if a communicating party has categorically rejected a pre-determined, configurable number of override suggestions, then learning designed to reduce the likelihood that such rejected suggestions are presented in the future may be triggered. Such learning may be performed by machine learning and/or human learning. In one example of the present invention, learning is ongoing and thus the decision at 1130 is substantially always YES.

If learning has been triggered at 1130, then at 1140 a determination can be made concerning whether the learning will be performed via machine learning. Such machine learning can include, but is not limited to, Bayesian learning methods that perform searching over alternative dependency structures and apply a score (such as the Bayesian Information Criteria) methods, Bayesian classifiers and other statistical classifiers, including decision tree learning methods, support vector machines, linear and non-linear regression, and neural network representations. If the determination at 1140 is YES, that machine learning will be employed, then at 1160 such learning is performed. Thus, processing that includes, but is not limited to, adapting rules for selecting communication channels and determining override suggestions can be performed. But if the determination at 1160 is NO, then at 1150, human learning is performed.

At 1170, a determination is made concerning whether the machine learning of 1160 should be reviewed by a human. By way of illustration, machine learning can benefit from human direction to facilitate adapting rules etc. in a more timely fashion than may be possible through unsupervised machine learning. If the determination at 1170 is YES, then at 1180 such human review may be performed. Thus, one or more data structures, processes, objects, threads, and computer components and the like may be updated by human intervention. At 1190, the communication selected at 1120 can be scheduled, calendared and/or initiated.

Figure 12:
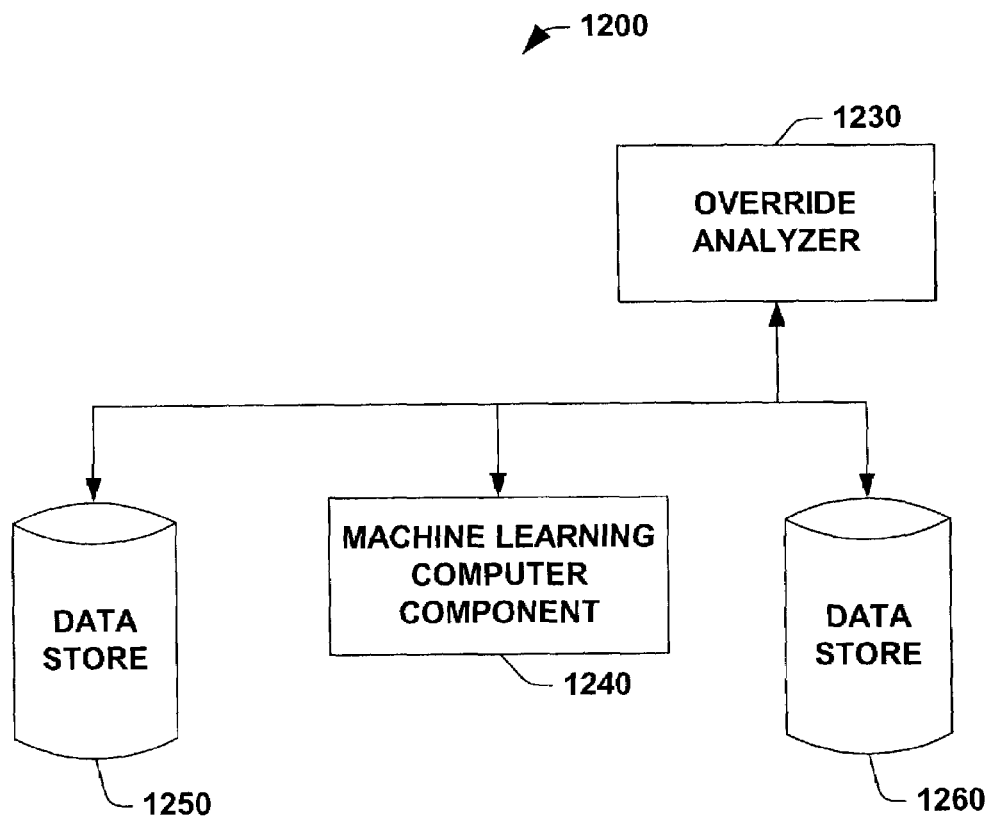
FIG. 12 is a schematic block diagram of a system for identifying a communication channel that maximizes the utility of a communication, where the system can undertake machine learning, in accordance with an aspect of the present invention.

FIG. 12 illustrates a system 1200 for identifying a communication channel that is predicted to maximize the utility of a communication where the system 1200 can undertake machine learning, either automatic or supervised. The system 1200 includes an override analyzer 1230 and a machine learning computer component 1240. The machine learning computer component 1240 and the override analyzer 1230 also have access to two data stores, a channel data store 1250 and an override analyzer data store 1260. While two data stores are illustrated, it is to be appreciated that a greater and/or lesser number of data stores may be employed in accordance with the present invention. It is to be further appreciated that although two separate computer components (the override analyzer 1230, and the machine learning computer component 1240) are illustrated that such components may be combined into a lesser number of components and/or distributed into a greater number of components.

Communication channels that will maximize the utility of a communication are initially identified. The override analyzer 1230 determines whether such initial identification(s) should be overridden and/or whether information concerning potential overrides should be presented to a communicating party(s). The machine learning computer component 1240 monitors the activities of the override analyzer 1230 and adapts processing associated with such activities. The machine learning computer component 1240 updates one or more values (e.g., neural network weights, decision theoretic formulae constants, decision theoretic formulae components) stored in the channel data store 1250 and/or the override analyzer data store 1260. Thus, the machine learning computer component 1240 can be employed to tailor the system 1200 to the needs and/or requirements of communicating parties. The machine learning computer component 1240 can employ techniques including, but not limited to, Bayesian learning (such as the Bayesian Information Criteria, etc.) methods, Bayesian classifiers and other statistical classifiers, including decision tree learning methods, support vector machines, linear and non-linear regression, and neural network techniques.

Figure 13:
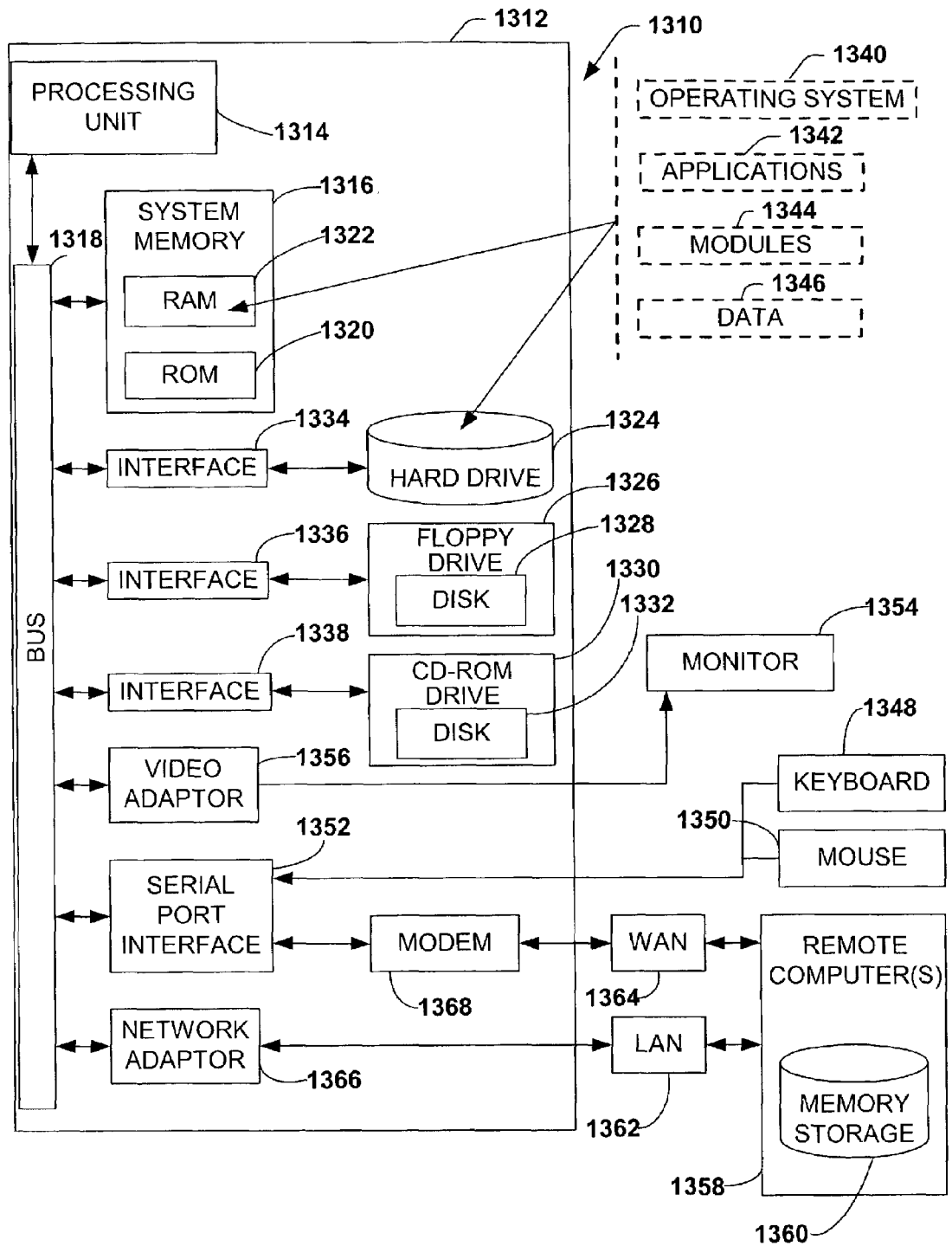
FIG. 13 is a schematic block diagram of an example computing environment in which the present invention can operate, in accordance with an aspect of the present invention.

In order to provide additional context for various aspects of the present invention, FIG. 13 and the following discussion are intended to provide a brief, general description of a suitable computing environment 1310 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 13, an exemplary environment 1310 for implementing various aspects of the invention includes a computer 1312, the computer 1312 including a processing unit 1314, a system memory 1316 and a system bus 1318. The system bus 1318 couples system components including, but not limited to, the system memory 1316 to the processing unit 1314. The processing unit 1314 may be any of various available processors. Dual microprocessors and other multi-processor architectures also can be employed as the processing unit 1314.

The system bus 1318 can be any of several types of bus structure including a memory bus or memory controller, a peripheral bus and a local bus using any of a variety of available bus architectures. The system memory 1322 includes read only memory (ROM) 1320 and random access memory (RAM) 1322. A basic input/output system (BIOS), containing the basic routines that help to transfer information between elements within the computer 1312, such as during start-up, is stored in ROM 1320.

The computer 1312 further includes a hard disk drive 1324, a magnetic disk drive 1326, (e.g., to read from or write to a removable disk 1328) and an optical disk drive 1330, (e.g., for reading a CD-ROM disk 1332 or to read from or write to other optical media). The hard disk drive 1324, magnetic disk drive 1326 and optical disk drive 1330 can be connected to the system bus 1318 by a hard disk drive interface 1334, a magnetic disk drive interface 1336 and an optical drive interface 1338, respectively. The drives and their associated computer-readable media provide nonvolatile storage of data, data structures, computer-executable instructions, etc. for the computer 1312. Although the description of computer-readable media above refers to a hard disk, a removable magnetic disk and a CD, it should be appreciated that other types of media that are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1322, including an operating system 1340, one or more application programs 1342, other program modules 1344 and program data 1346. It is to be appreciated that the present invention can be implemented with various operating systems or combinations of operating systems.

A user can enter commands and information into the computer 1312 through a keyboard 1348 and a pointing device, such as a mouse 1350. Other input devices (not shown) may include a microphone, an IR remote control, a joystick, a game pad, a satellite dish, a scanner, or the like. These and other input devices are often connected to the processing unit 1314 through a serial port interface 1352 that is coupled to the system bus 1318, but may be connected by other interfaces, such as a parallel port, a game port, a universal serial bus ("USB"), an IR interface, etc. A monitor 1354 or other type of display device is also connected to the system bus 1318 via an interface, such as a video adapter 1356. In addition to the monitor, a computer typically includes other peripheral output devices (not shown), such as speakers, printers etc.

The computer 1312 may operate in a networked environment using logical connections to one or more remote computers, such as a remote computer(s) 1358. The remote computer(s) 1358 may be a workstation, a server computer, a router, a personal computer, microprocessor based entertainment appliance, a peer device or other common network node, and typically includes many or all of the elements described relative to the computer 1312, although, for purposes of brevity, only a memory storage device 1360 is illustrated. The logical connections depicted include a local area network (LAN) 1362 and a wide area network (WAN) 1364. Such networking environments are commonplace in offices, enterprise-wide computer networks, intranets and the Internet.

When used in a LAN networking environment, the computer 1312 is connected to the local network 1362 through a network interface or adapter 1366. When used in a WAN networking environment, the computer 1312 typically includes a modem 1368, or is connected to a communications server on the LAN, or has other means for establishing communications over the WAN 1364, such as the Internet. The modem 1368, which may be internal or external, is connected to the system bus 1318 via the serial port interface 1352. In a networked environment, program modules depicted relative to the computer 1312, or portions thereof, may be stored in the remote memory storage device 1360. It will be appreciated that the network connections shown are exemplary and other means of establishing a communications link between the computers may be used.

It is to be appreciated that aspects of the present invention may be embodied in a computer readable medium. Thus, a computer readable medium can store computer executable components for a system that facilitates communication between entities in accordance with the present invention. For example the computer executable components can comprise an identifying component that identifies a plurality of communication channels that respectively provide for communication between at least two entities. Furthermore, the computer executable components can comprise an analyzing component that analyzes a first communication data set associated with a first entity and a second communication data set associated with a second entity, the analyzing component identifying one or more communication channels of the plurality of channels based at least in part on analysis of the first and second communication data sets. The computer readable medium can be, but is not limited to being, a memory, a random access memory (RAM), a read-only memory (ROM), a programmable ROM (PROM), an electrically erasable PROM (EEPROM), a compact disc (CD), a digital versatile disk (DVD) and a memory stick.

Figure 14:
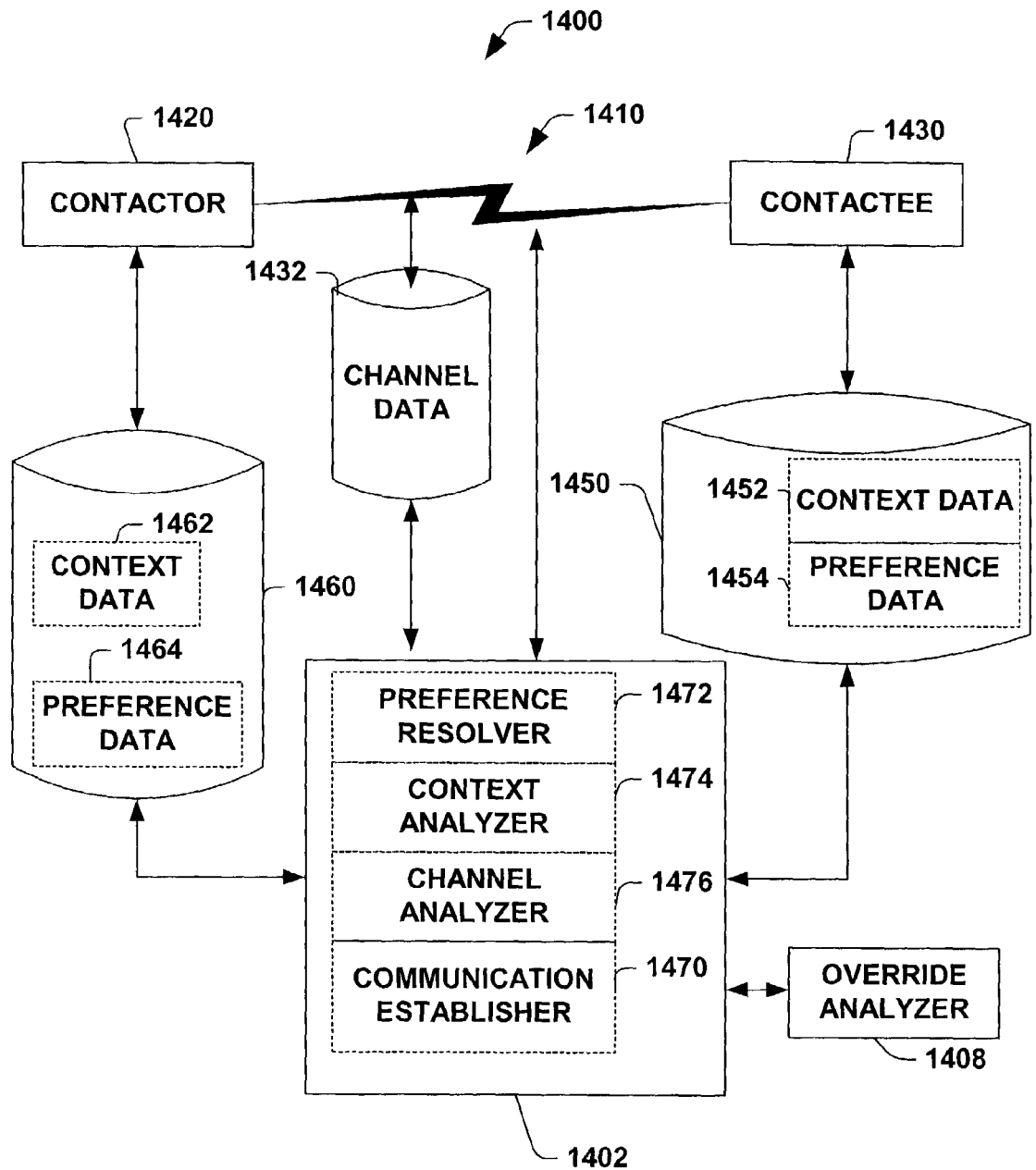
FIG. 14 is a schematic block diagram of a channel manager, in accordance with an aspect of the present invention.

Referring now to FIG. 14, a system 1400 that includes a channel manager 1402 is illustrated. The channel manager 1402 identifies communication channels that facilitate optimizing the utility of a communication 1410 between a contactor 1420 and a contactee 1430. While one contactor 1420 and one contactee 1430 are illustrated, it is to be appreciated that the system 1400 facilitates identifying optimal communication channels between two or more communicating parties (e.g., communication groups). It is to be further appreciated that the parties to the communication 1410 may include human parties, apparatus and/or electronic processes. Thus, as employed herein, the terms contactee and contactor include groups of contactors and groups of contactees.

The communication 1410 may be carried over a variety of channels including, but not limited to, telephone channels, computer channels, fax channels, paging channels and personal channels. The telephone channels include, but are not limited to POTS telephony, cellular telephony, satellite telephony and Internet telephony. The computer channels can include, but are not limited to email, collaborative editing, instant messaging, network meetings, calendaring and devices employed in home processing and/or networking. The personal channels include, but are not limited to videoconferencing, messengering and face-to-face meeting. Data concerning a current channel (e.g., a phone that is busy) can be analyzed, as can data concerning the likelihood that the channel may become available (e.g., phone will no longer be busy).

Identifying the optimal communication channel can include considering the benefits of establishing the communication 1410 at a first point in time, with the communication channels available at that point in time, and considering the costs of delaying establishing the communication 1410 to a second point in time when other communication channels may be available.

The channel manager 1402 has access to a channel data store 1435, a contactor data store 1460 and a contactee data store 1450. The contactor data store 1460, the channel data store 1435 and the contactee data store 1450 can store data in data structures including, but not limited to one or more lists, arrays, tables, databases, stacks, heaps, linked lists and data cubes and can reside on one physical device and/or can be distributed between two or more physical devices (e.g., disk drives, tape drives, memory units). Furthermore, the contactor data store 1460, the channel data store 1435 and the contactee data store 1450 can reside in one logical device and/or data structure.

The channel manager 1402 can be a computer component, as that term is defined herein, and thus the channel manager 1402 can be distributed between two or more cooperating processes and/or reside in one physical or logical device (e.g., computer, process).

In a general formulation of the problem addressed by the channel manager 1402, the present invention considers a "communications value function", $f$, that returns a value for each communication channel or subset of channels under consideration or an ordering over communication channels in terms of acceptability of the channel or subset of channels.

$$\text{Value(Channel)} = f(\text{preferences(contactee, contactor, organization), context(contactee, contactor))}$$

where the context of contactee and contactor include group membership, group context, the devices that are available, the time of day, tasks and situation at hand for the contactor and contactee, and the like. It is to be appreciated that the context of the contactee and contactor may be stored in one or more formats, including, but not limited to, an XML schema. In one example of the present invention, the channel manager 1402 initially orders the channels by assigned value and attempts to create a connection or to advise the contactor 1420 and/or contactee 1430 concerning the best possible connection.

In general, there may be uncertainty concerning preferences and one or more parameters employed to model a context. In this situation, a probability distribution over the different states of variables can be inferred and expected values for channels can be computed. For example, if there is uncertainty concerning aspects of the context of the contactee, the probability distribution (here represented abstractly), given evidence E observed about the context, and sum over the uncertainties can be represented:

Expected value(Channel)=$\Sigma_i f$(preferences(contactee, contactor, organization), p(context i of contactee|E), context of contactor)

While this expected value can be employed to initially identify the channel that is predicted to maximize the utility of the communication 1410, in one example of the present invention the contactee 1430 will be presented with options concerning the communication. The contactee 1430 reaction to the options will then determine the channel that is selected for the communication 1410. The reactions to the options can be employed in machine learning that facilitates adapting the channel manager 1402.

Considering now more specific examples of the use of expected utility, a particular basic formulation of decision-making under uncertainty in the context of the preferences of the contactor 1420 and/or contactee 1430 is captured by the following Equations:

Equation 1:

$$A^* = \operatorname*{argmax}_{j} u(A_j, A_k^C, C, context^R, context^C)$$

where A* is the ideal, selected communication modality for the communication;

$A_j$ represents each of all communication modalities being considered;

$A_k^C$ is the initial communication modality employed by the contactor;

C refers to an identity or group membership of the contactor;

$context^R$ is the known or assumed context of the contactee;

$context^C$ is the known or assumed context of the contactor; and u( ) represents a utility function operating on the arguments that provides an encoding of preferences about communications for the recipient or another entity whose preferences are being used to guide the handling of the communications, employed to determine optimal communication actions that maximize the utility of communications between the contactor and the contactee.

Equation 2:

$$A^* = \operatorname*{argmax}_{j} \sum_{i} p(context_i^R | E) u(A_j, A_k^C, C, context_i^R, context^C)$$

where A* is the ideal, selected communication modality for the communication;

$A_j$ represents each of all communication modalities being considered;

$A_k^C$ is the initial communication modality employed by the contactor;

C refers to an identity or group membership of the contactor, $context^R i$ represents each of the contexts being considered for the contactee, representing the situation of the contactee;

$p(context^R i|E)$ represents the probability distribution over the context of the contactee, representing the conditional probabilities that the contactee is in a certain context given the evidence E;

$context^C$ is a known or assumed context of the contactor; and u( ) represents a utility function operating on the arguments that provides an encoding of preferences about communications for the recipient or another entity whose preferences are being used to guide the handling of the communications, employed to determine optimal communication actions that maximize the utility of communications between the contactor and the contactee.

Equation 3:

$$A^* = \operatorname*{argmax}_{j} \sum_{i} p(context_i^C | E) u(A_j, A_k^C, C, context^R, context_i^C)$$

where A* is the ideal, selected communication modality for the communication;

$A_j$ represents each of all communication modalities being considered;

$A_k^C$ is the initial communication modality employed by the contactor;

C refers to an identity or group membership of the contactor;

$context^C i$ represents each of the contexts being considered for the contactor, representing the situation of the contactor;

$p(context^C i|E)$ represents the probability distribution over the context of the contactor, representing the conditional probabilities that the contactor is in a certain context given the evidence E;

$context^R$ is a known or assumed context of the contactee; and u( ) represents a utility function operating on the arguments that provides an encoding of preferences about communications for the recipient or another entity whose preferences are being used to guide the handling of the communications, employed to determine optimal communication actions that maximize the utility of communications between the contactor and the contactee.

Equation 4:

$$A^* = \operatorname*{argmax}_{j} \sum_{i} p(context_i^R | E) \sum_{n} p(context_n^C | E) u(A_j, A_k^C, C, context_i^R, context_n^C)$$

where A* is the ideal, selected communication modality for the communication;

$A_j$ represents each of all communication modalities being considered;

$A_k^C$ is the initial communication modality employed by the contactor;

C refers to an identity or group membership of the contactor;

$context^R i$ represents each of the contexts being considered for the contactee, representing the situation of the contactee;

$p(context^R i|E)$ represents the probability distribution over the context of the contactee, representing the conditional probabilities that the contactee is in a certain context given the evidence E;

context$^C$n represents each of the contexts being considered for the contactor, representing the situation of the contactor;

p(context$^C$n|E) represents the probability distribution over the context of the contactor, representing the conditional probabilities that the contactor is in a certain context given the evidence E;

u( ) represents a utility function operating on the arguments that provides an encoding of preferences about communications for the recipient or another entity whose preferences are being used to guide the handling of the communications, employed to determine optimal communication actions that maximize the utility of communications between the contactor and the contactee.

It is noted that the above equations can be extended to a consideration of the utility of communications for different times in the future, based on the current contexts of the contactee and contactor or forecasts of the future contexts of the contactee and contactor. In addition, the encoding of preference information in a parameter representing a cost of delaying a communication as a function of time and at least one of the identity, group memberships, relationships, or contexts of the contactor and contactee can be considered. Moreover, encoding of preferences about the cost of delaying a communication in a decision-theoretic analysis of the expected utility of the best modality and time for scheduling a communication can be determined.

In another aspect, the encoding of preferences information about a contactee's desire to communicate a stored message with contactors associated with particular identities, groups, and/or contexts to receive can be utilized. This can include information about the preferences of the contactee which is stored that captures preferences about communicating some portion of the present or future context of the contactee. Other extensions include an encoding of preferences about sharing some information about the contactee's context when an analysis or policy indicates that a communication should be rescheduled for a later time.

The extensions can include providing a parameter and encoding enabling contactees to allow contactors associated with particular groups or contexts to override a preference in order to defer a communication to breakthrough a planned deferral of a communication with a gesture. For example, a message can be delivered or played to a contactor such as "I am really busy now, but for you (contactor), if you really think this is important, you can press the pound key to speak with me (contactee) now."

The contactor 1420 and contactee 1430 contexts represent rich sets of deterministic or uncertain variables. Data associated with automated assessments and/or directly marked indications of urgency or importance in the communications can also be evaluated in identifying optimal communication channels. The contextual variables can be treated as explicit deterministic or probabilistic factors in the optimization.

The present invention can also compare the best communication option available now with the best communication option that will be available later, and update the value of the communication for the losses based in delays in communication, and potential gains or losses based on changes in disruptiveness if the communication should come at the later time t when the contactee is in a different state (e.g., more available or less available).

Thus, decision-theoretic formulae like those described in equations 1 through 4 are employed to produce one or more expected utilities for one or more sets of contactors and/or contactees that are established into one or more groups that are subsequently managed. In one example aspect of the present invention, a communication is automatically initiated, scheduled and/or calendared based on such information. But in another aspect of the present invention, information concerning those expected utilities is presented to one or more parties. By way of illustration, a contactor 1420 is presented with a list of communications with high utilities determined in accordance with the preferences of the contactee. The contactor 1420 then selects from the list.

While one communication 1410 between one contactor 1420 and one contactee 1430 is illustrated, it is to be appreciated that a greater number of communications between a similar or greater number of contactors 1410 and/or contactees 1420 can be identified by the present invention. By way of illustration, communications 1410 to facilitate group meetings can be identified by the system 1400, as can multiple communications 1410 between two communicating parties (e.g., duplicate messages sent simultaneously by email and pager).

The communication 1410 that is identified by the channel manager 1402 may depend, at least in part, on one or more sets of data concerning communication channels, contactors and/or contactees, for example. One possible data set, the communication channel data set 1435 concerns the available communication channels. The available communication channels can include, but are not limited to email (of various priorities), telephone (POTS, cellular, satellite, Internet), paging, runners/couriers, video conferencing, face-to-face meeting, instantaneous collaborative editing, delayed posting collaborative editing, picture in picture television, home device activation (e.g., turning on lights in the study, ringing the telephone with a distinctive pattern) and so on. A communication channel may not be a static entity, and thus information concerning the state, capacity, availability, cost etc., of the communication channels can change. Thus, the communication channel data set 1435 can contain current state information and/or data to facilitate making predictions concerning future state, capacity, availability, cost etc. associated with one or more communication channels.

The channel manager 1402 can also have available the contactee data 1450 that includes information related to hardware, software, contactee task being performed, contactee attention status, contactee context data 1452 and contactee preference data 1454, for example. By way of illustration, the hardware data can include information related to what hardware is available to the contactee, what hardware is being employed by the contactee (e.g., desktop, laptop, PDA), the capabilities of that hardware (e.g., enough memory and communication bandwidth for videoconferencing), the cost of employing that hardware and the state(s) in which that hardware is currently functioning (e.g., online, offline). The hardware data can also include information concerning usage patterns that facilitate determining the likelihood that an unavailable piece of hardware will become available. The software data can include information related to what software is available to the contactee, what software is currently being employed by the contactee (e.g., word processor in use), the capabilities of that software (e.g., allows collaborative editing) and the state(s) in which that software is currently functioning (e.g., running and active, running but inactive). The software data can also include information concerning usage patterns that facilitate determining the likelihood that an unavailable piece of software will become available.

The contactee data 1450 can also contain preference data 1454 concerning the preferences of the contactee 1430. The preference data 1454 can include data concerning how the contactee 1450 prefers to be contacted, with those preferences varying over time with respect to, for example, various contactors 1420, various times, various channels and various topics of communication. The contactee preference data 1454 can include data concerning, but not limited to, preferences concerning the time of day for communicating (e.g., early morning, business hours, evening, late night, sleeping hours), the time of the week for communicating (e.g., Monday through Friday, Weekend, Holiday, Vacation), identity of contactors (e.g., employer, employees, critical colleague, colleague, peers, nuclear family, extended family, close friends, friends, acquaintances, others), hardware currently available or available within a time horizon of a communication attempt (e.g., desktop, laptop, home computer), preferred software (e.g., email, word processing, calendaring) and preferred interruptability (e.g., do not interrupt while focused on work, only interrupt while not focused), for example. While six preferences are identified in the preceding sentence, it is to be appreciated that a greater or lesser number of preferences can be employed in accordance with the present invention.

The contactee data 1450 can also include a context data 1452. The context data 1452 is generally related to observations about the contactee 1430. For example, observations concerning the type of activity in which the contactee 1430 is involved (e.g., on task, not on task), location of the contactee 1430 (e.g., office, home, car, shower), calendar (e.g., appointment status, appointment availability), history of communications with other party (e.g., have replied to email in the past, have spoken to on the telephone recently, the utility of the interaction, the duration of the interaction), background ambient noise at current location, number of hours at work that day and attentional status (e.g., high focus, focus, light focus, conversation with another person, light activity) can be stored in the context data 1452.

On some occasions the context data 1452 may be incomplete (e.g., video analysis data unavailable because video camera broken). Thus, the channel manager 1402 reasons concerning the optimal communication while relying on such incomplete data. Thus, the contactee data 1450 can also include information to facilitate producing one or more probabilities associated with a missing data element. By way of illustration, the contactee data 1450 can contain information operable to predict the likelihood that the contactee 1430 is in a high attentional state even though gaze tracking information is unavailable.

The contactee data 1450 can further include information concerning the long-term and/or acute, dynamically changing communication needs of the contactee 1450. By way of illustration, the contactee 1450 may need to have no interruptions for the next hour (e.g., "hold everything unless high critical on this task or an hour from now"). By way of further illustration, to prevent a contactor 1420 from "ducking" the contactee 1430 by leaving an email or a voice mail when the contactee 1430 desires to speak with the contactor 1420, the contactee 1430 can require that contacts from the contactor 1420 be made in a certain way within X units of time of notification that the contactor 1420 desires communication.

In addition to the contactee data 1450 employed in determining the optimal communication, data concerning the contactor 1420 may also be employed. The contactor data 1460 can include hardware, software, context, preference and communication needs data substantially similar to that available for the contactee 1430, but different in that it is prepared from the point of view of the contactor 1420.

The present invention is not limited to communications between two parties or to a single communication channel between two parties. It is to be appreciated that multiple channels and/or multiple communicating parties can be treated as increased sets of alternatives that complicate utility maximizing computations without changing the fundamental process of identifying and establishing one or more communication channels based on the preferences, contexts and capabilities of the communicating parties.

The channel manager 1402 can include several computer components responsible for implementing portions of the functionality of the channel manager 1402. For example, the channel manager 1402 can include a preference resolver 1472. The preference resolver 1472 examines the contactee preference data 1454 and the contactor preference data 1464 to find correlations between the two sets of data. In one example of the present invention, information concerning the correlations is stored in a resolved preference data. For group communications, the preference resolver 1472 examines multiple sets of preference data to find correlations between the preferences. By way of illustration, for a communication between two parties, the preference resolver 1472 can determine that both parties would prefer to communicate by high priority email for communications associated with a first task. Similarly, the preference resolver 1472 can determine that the contactee 1430 would prefer to communicate by collaborative editing and phone for communications concerning a particular document, while the contactor 1420 would prefer to communicate only by telephone. Thus, the preference resolver 1472 produces data (e.g., resolved preference data) or initiates processing that assigns values to the correlations between the contactee 1430 preferences and the contactor preferences 1420. In one example aspect of the present invention, the preferences of the contactee 1430 are given more weight, and thus, if the contactor 1420 attempted a phone conversation concerning the document for which the contactee 1430 preferred both phone and collaborative editing, then the preference resolver 1472 produces data or initiates processing that makes it more likely that the contactor 1420 communicates by both phone and collaborative editing. In another example aspect of the present invention, the preferences of the contactor 1420 are given priority over the preferences of the contactee. By way of illustration, when a human contactor 1420 is attempting to communicate with an electronic contactee 1430, the preferences of the contactor 1420 are considered more important, and thus the preference resolver 1472 produces values or initiates processing that makes it more likely that the preferences of the contactor 1420 are observed. In another example aspect of the present invention, the preference resolver 1472 produces a list of potential communication channels ranked on their responsiveness to the preferences.

The channel manager 1402 can also include a context analyzer 1474. The context analyzer 1474 examines the contactee context data 1452 and the contactor context data 1462 to find correlations between the two sets of data. In one example of the present invention, information concerning the correlations is stored in an analyzed context data. For group communications, the context analyzer 1474 may examine multiple sets of context data to extract information concerning the contexts. By way of illustration, for a communication between two parties, the context analyzer 1474 may determine that the contactee context is such that real-time communications are not immediately available but there is an $X_1$% likelihood that such communications will be available at a point of time $T_1$ in the future, and an $X_2$% likelihood that such communications will be available at a point of time $T_2$ in the future. Further, the context analyzer 1474 may determine that although the contactor 1420 has requested real-time telephony that the context of the contactor 1420 is such that email communication may optimize utility. For example, the context of the contactor 1420 may include information concerning the ambient noise at the location of the contactor 1420. The context analyzer 1474 may determine that the noise level is not conducive to optimizing utility by real-time telephony and thus may produce values and/or initiate processing that will make it more likely that the contactor 1420 will communicate with the contactee 1430 via email. Similar to processing performed by the preference resolver 1472, the context analyzer 1474 may, in different examples of the system 1400, weight the context of the contactee 1430 more than the context of the contactor 1420 or vice versa.

The channel manager 1402 can also include a channel analyzer 1476. The channel analyzer 1476 analyzes the communication channel data set 1435. The channel analyzer 1476 produces data concerning the current availability of a communication channel and/or the likelihood of the channel becoming available. In one example of the present invention, such data is stored in a communication channel data. The channel analyzer 1476 also examines one or more channels that the contactor 1420 specified for the communication, and/or one or more channels that the contactee 1430 listed as preferences in the contactee preference data 1454, for example.

The channel analyzer 1476 also examines currently available channels as determined by location information associated with the contactee 1430 and channels that may become available based on the activity of the contactee 1430. For example, if the contactee 1430 is currently driving home (as determined by GPS and schedule, for example), then the channel analyzer 1476 examines current cellular channels and additionally examines the channels available at the home of the contactee 1430. Thus, the channel analyzer 1476 facilitates producing data and/or initiating processing that makes it more likely that a desired channel is employed when determining the optimal communication channel(s) for the communication 1410 between the contactor 1420 and the contactee 1430.

The channel manager 1402 can also include a communication establisher 1478. Once the ideal communication actions A* have been identified, the communication establisher 1478 undertakes processing to connect the contactor 1420 and the contactee 1430 through the identified optimal communication channel. Such connection can be based, at least in part, on the resolved preference data, the analyzed context data and the communication channel data. For example, if the optimal communication 1410 is identified as being email, then the communication establisher can initiate an email composing process for the contactor 1420 (e.g., email screen on computer, voice to email converter on cell phone, email composer on two-way digital pager), and forward the composed email to the most appropriate email application for the contactee 1430 based on the identified optimal communication 1410. For example, the communication establisher 1478 can forward the email to the pager of the contactee 1430 based on GPS data associated with the location of the contactee 1430. In an alternative example of the present invention, the system 1400 does not include a communication establisher 1478, relying instead on contactor 1420 and/or contactee 1430 actions, for example, to establish the communication. It is to be appreciated that the preference resolver 1472, the context analyzer 1474, the channel analyzer 1476 and the communication establisher 1478 are computer components as that term is defined herein.

Figure 15:
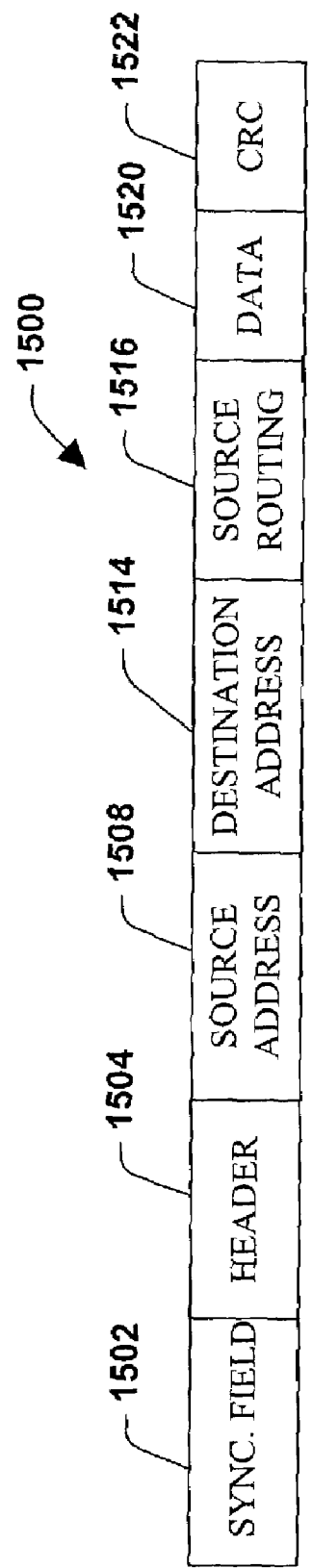
FIG. 15 is a schematic illustration of a data packet that can be transmitted between computer components in accordance with an aspect of the present invention.

Referring now to FIG. 15, information can be transmitted between various computer components via a data packet 1500. An exemplary data packet 1500 is shown that could be employed in an override analyzing application. The data packet 1500 includes a synchronization field 1502 that includes synchronizing bits that allow a device receiving the packet 1500 an opportunity to "lock on" to the packet 1500. A header field 1504 follows the synchronization field 1502 and includes information such as the length and type of packet. For example, the header field 1504 may indicate whether the packet 1500 is a packet type that requires a response from the receiving device. A source address field 1508 follows the header field 1504 and includes the address of the device from which the packet 1500 originated. Following the source address field 1508, the packet 1500 includes a destination address field 1514 that holds the address of the device to which the packet 1500 is ultimately destined. A data field 1520 in the packet 1500 includes various information that is intended to be communicated to the receiving device. The data packet 1500 ends with a cyclical redundancy check (CRC) field 1522 that serves as an error detecting field whereby a receiving device can determine if it has properly received a packet 1500.

Figure 16:
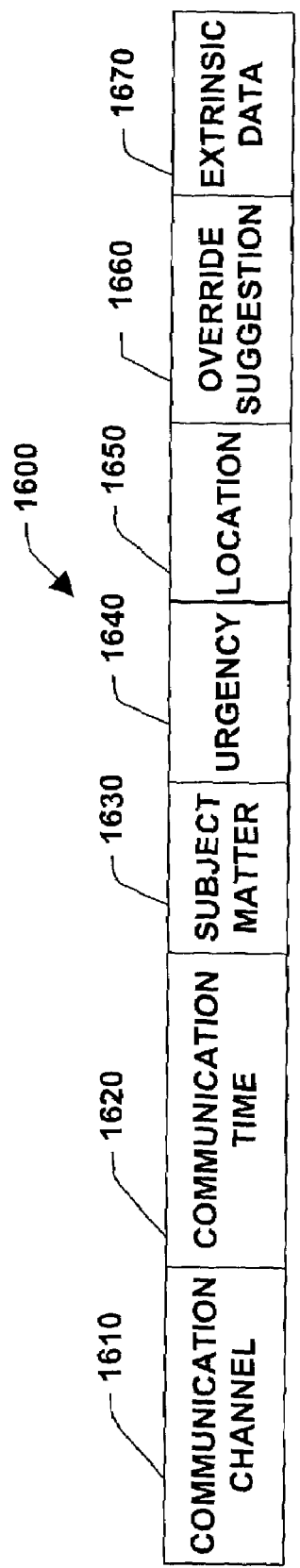
FIG. 16 is a schematic illustration of sub-fields of a data field from a data packet that can be transmitted between computer components in accordance with the present invention.

FIG. 16 is a schematic illustration of sub-fields 1600 within the data field 1520. The sub-fields 1600 discussed are merely exemplary and it is to be appreciated that a greater or lesser number of fields could be employed with various types of data germane to facilitating a communication utility analysis in accordance with the present invention. The sub-fields 1600 include a communication channel field 1610 that can include communication channel identifying data. A communication time field 1620 can include information relating to the planned and/or initiated communication time. A subject matter field 1630 can include information regarding the subject matter of the communication between the parties. Other sub-fields that could be included are a communication urgency field 1640, a communicating party location field 1650, an override suggestion field 1660, an extrinsic data field 1670, and a variety of other sub-fields as discussed. Thus, one example data packet 1600 may include a first field that stores a first communication channel expected utility data associated with an initially identified communication channel and a second field that stores a second communication channel expected utility data associated with a potentially overriding communication channel.

FIG. 17 schematically illustrates a representative data structure 1700 in connection with the subject invention. The data structure 1700 is merely exemplary and it is to be appreciated that numerous other structures are contemplated that provide for organizing and/or storing a plurality of data types conducive to carrying out a communication utility analysis in connection with the subject invention. Any such data structure suitable for employment in connection with the present invention is intended to fall within the scope of the hereto appended claims.

The data structure 1700 includes communication channel information, communication time information, communication subject matter information, communication urgency information, communicating party location information, override determination information, extrinsic information, and a variety of other data fields. Thus, in one example of the present invention, a memory that stores data that can be accessed by a computer component may store a data structure that holds a first field that stores a first communication channel expected utility associated with an initially identified communication channel and a second field that stores a second communication channel expected utility associated with a potentially overriding communication channel.

Figure 18:
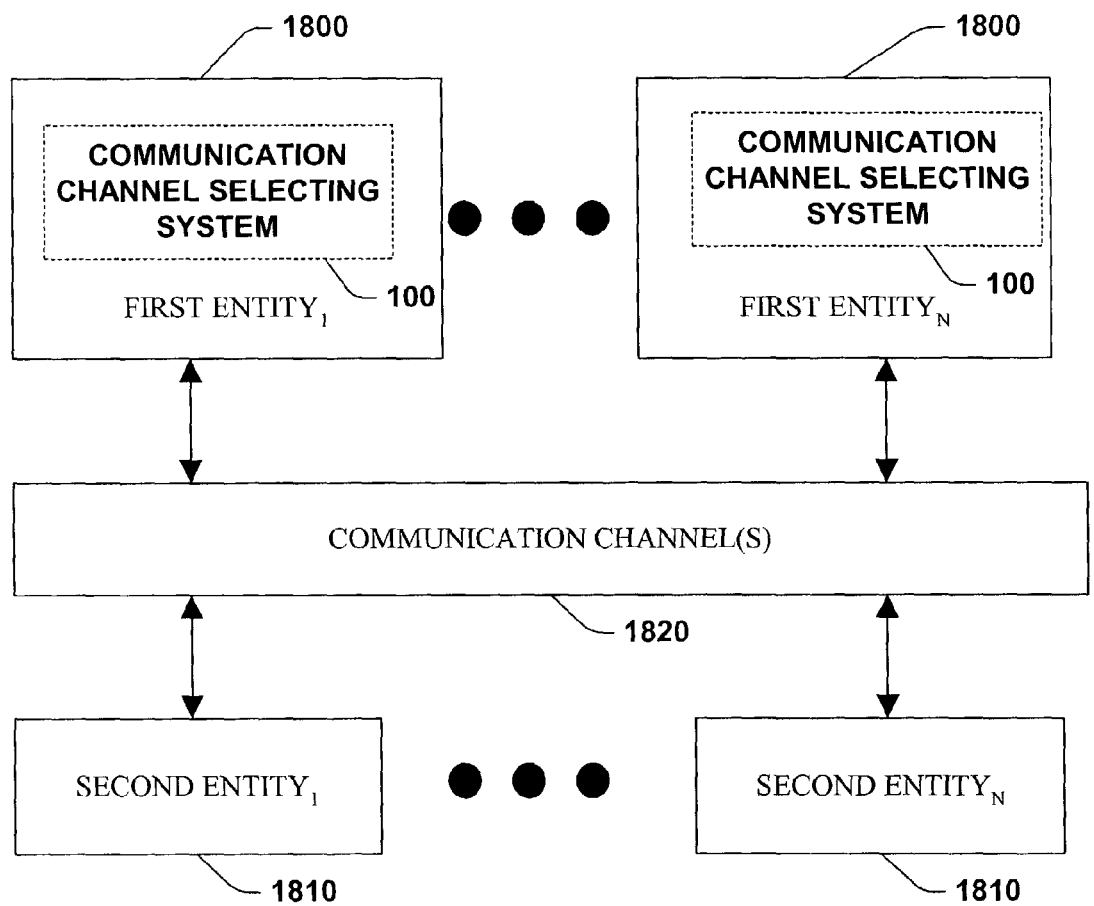
FIG. 18 schematically illustrates an architectural application of the subject invention with respect to a plurality of communicating entities.

FIG. 18 is an illustration of N number of first entities 1800 (e.g., individual(s) and/or device(s) and/or cluster(s) and/or system(s)) (N being an integer) that include communication channel selecting systems 100 and M number of second entities 1810 (e.g., individual(s) and/or device(s) and/or cluster(s) and/or system(s)) (M being an integer) that do not include a communication channel selecting system 100. The first entity(s) 1800 may desire to communicate amongst themselves via any of a plurality of communication channels, and a subset of the first entities may desire to communicate with a subset of the second entities 1810 via one or more of a plurality of communication channels 1820. The respective communication channel selecting systems 100 facilitate maximizing communication utility by selecting and then selectively overriding the best communication channel of the channels 1820 to employ based on a utility analysis as discussed herein. In the event two or more communication channel selecting systems 100 are concurrently involved with channel selection, the respective systems 100 can coordinate, address conflicts and select channel(s) that maximize overall utility. However, it is to be appreciated that certain systems 100 can have higher authority than other analyzers and thus the hierarchical ranking of the analyzers can be part of the utility analysis. Additionally, a single system 100 could be selected to perform channel selection like a network manager while the others sit idle.

Figure 19:
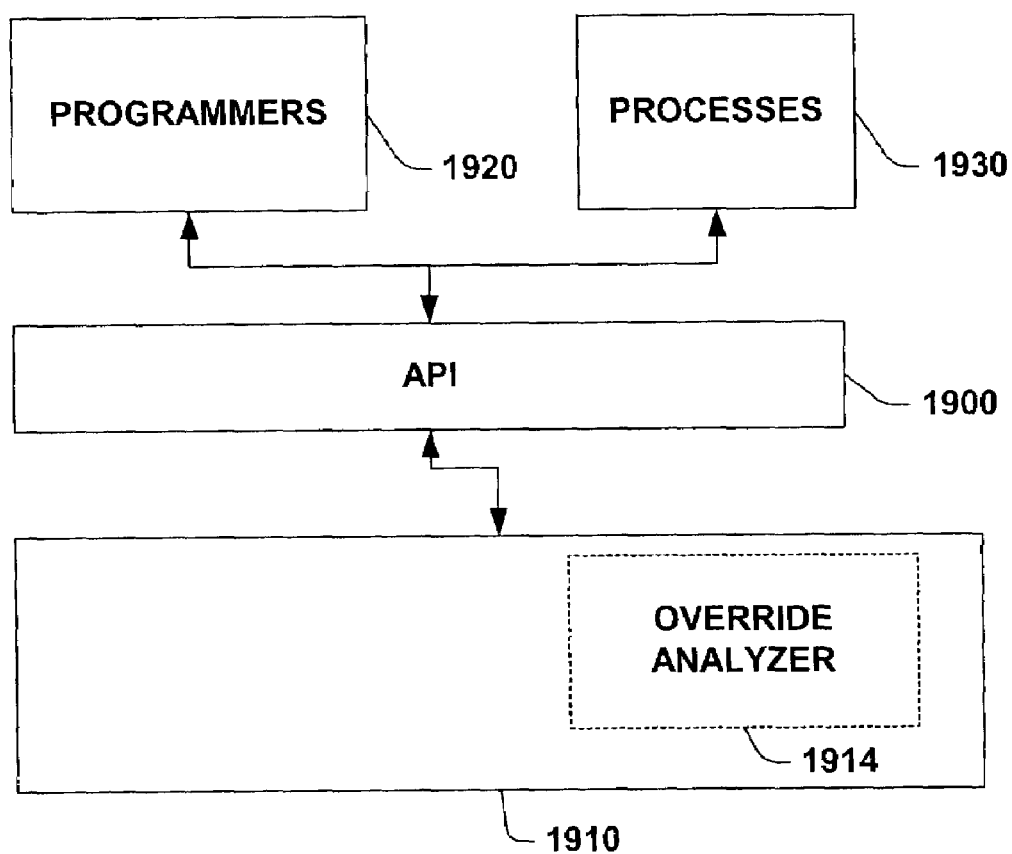
FIG. 19 schematically illustrates an application programming interface employed in accordance with an aspect of the present invention.

Referring now to FIG. 19, an application programming interface (API) 1900 is illustrated providing access to a system 1910 that includes an override analyzer 1914. The API 1900 may be employed, for example, by programmers 1920 and/or processes 1930 to gain access to processing performed by the system 1910. Similarly, the API 1900 may be employed to provide data values to the system 1910 and/or retrieve data values from the system 1910. Thus, in one example of the present invention, a set of application program interfaces may be embodied on a computer-readable medium. The interfaces may be executed by a computer component to gain access to an override analyzing program. Such interfaces can include, but are not limited to, a first interface that receives initial communication channel information, a second interface that receives potential overriding communication channel information and a third interface that receives override decision information where the override decision is based, at least in part, on comparing the initial communication channel information with the potential overriding communication channel information.

Before proceeding with a detailed discussion of FIGS. 20-26, some possible applications of various components and processes as described herein is presented In one aspect of the present invention, various mixed-initiative applications can be provided. Such applications can include automated policies for communications devices such as cell phones, for example, and include integration with other time/identity parameters and/or integration with context sensitive applications such as calendar and scheduling applications. For example, appointment types can be assigned different levels of interruptability, or can be achieved in the language of: an existence of a free/busy set of guidelines or policies, a busy versus no appointment consideration, and/or in consideration of free time as well as other considerations. Based on appointments or schedules, for example, a standard approach to incoming calls can be changed in view of existing profiles or different profiles can be selected automatically (e.g., rings or message indications go to silent or vibrate automatically based on calendar settings for presentations, but not for regular meetings; for outdoor sporting events, the default ring goes to a louder ring, and so forth). Thus, users can go to movie theaters and not worry about fumbling to set cell phones to silent mode, and having to turn it back on afterwards, for example. In addition, profiles can be adjusted by day of week and time of day to cause phones or communications devices to shift to different modes of operations (e.g., setting the system up so that after 6 pm, the system goes into home mode, and after 10 pm, the system goes into home night mode.

In another aspect, some users can be tagged or identified as followed, or waiting for a call, and these type users may get a louder ring or be immune to calendar-based quieting. Also, a simple gesture can be employed to give users a one-shot louder incoming or special ring, that is reset after the call comes in, to capture the notion of, "I don't want to miss this person," but after the call, the device resorts back to a standard profile or policy. More generally, aspects of identity-based auto-forward can be employed if a call comes in while the user is in a meeting that is assigned some threshold of interruptability value. If the person is not on a "breakthrough" or "temporary breakthrough" list (a one-shot scenario), the call is forwarded to the user's voice mail or other delivery option.

In yet another aspect, a conditional contactee initiated breakthrough can be provided. This can include a feature where the phone or communications device answers automatically in some contexts, (e.g., meetings, and contactors (on a special list) receive an outgoing message from the phone itself, telling the caller that the user is currently in a meeting (or busy), but if this is important they only need to push # and they can break through—such as "Hi, you've reached my pocket, but I'm in a meeting—if you really need to breakthrough then push the pound sign to vibrate my device; else leave voice mail or other message by hitting * . . . ":>). Given a breakthrough, the phone would ring softly with a special ring or other feedback indicating a contactor initiated breakthrough.

Other applications can include a cell phone-based secretary, sharing of scheduling information, automated deferral, and/or rescheduling. For example, instead of or in addition to forwarding a caller off to a voice mail system, if the user is busy per calendar, and the user is on a list of special people, per address book annotations, the phone could answer and share out with the caller that the contactee will be busy x time, per the information about when the meeting ends on the calendar, (e.g., "Andy is currently busy, but will be free to chat in '30' minutes. Unless you'd like to breakthrough now (with # key), I will let him know about your call at the end of the meeting.") At the end of the meeting the user is informed about the call, with a ring, and perhaps even with a locally recorded message. Beyond having a one touch button to do call back, the contactor can attempt to schedule with touch keys a time to speak again, (e.g., by allowing them to select times ahead in 15 or 30 minute increments, for example, based on the contactee's calendar. Given a tentative schedule, the user's phone could ring, get the user online, and then dial out the call to bring the respective parties together.

In another aspect, summaries of the incoming calls can be updated on a display even during meetings. Summaries of automated re-scheduling of calls, based on the contactee's preferences can also appear. Users or contactors can also type messages that may appear on the screens. Similar scenarios with smart secretary can interact with someone else when the user is on the phone when another call comes in (even with local recording of a message).

In still another aspect, accelerometers and/or other type transducers may be employed (e.g., if my phone is traveling at more than 15 miles an hour, consider me busy—or ring louder.) This could include considering ambient noise and if no meeting were in process, adjust the loudness of the ring in reaction to the ambient noise. If it is sensed that a communications device is in the user's pocket, go to vibrate automatically. If not, go to audio or other selected mode. As can be appreciated, a plurality of such communications policies can be provided.

Figure 20:
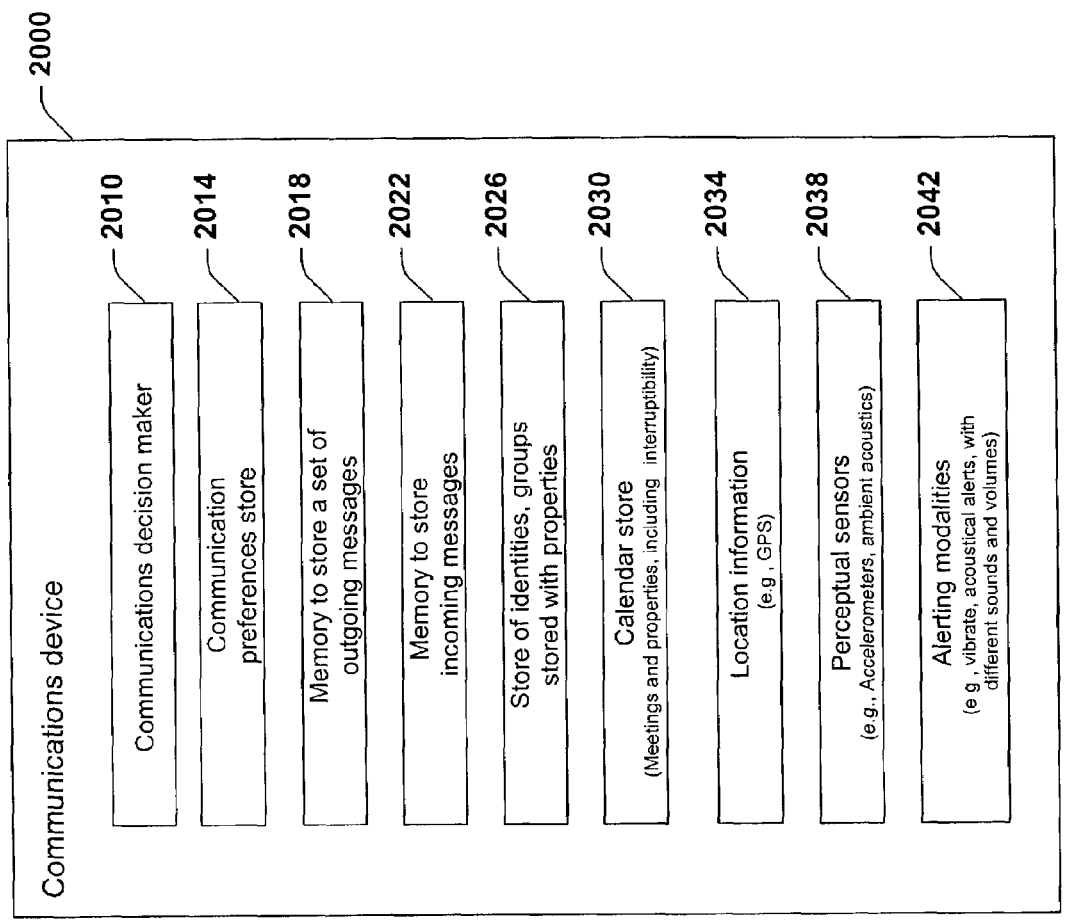
FIGS. 20-26 illustrate exemplary mixed-initiative communications applications in accordance with an aspect of the present invention.

In view of the proceeding discussion, FIGS. 20-26 illustrate an exemplary mixed-initiative communications application in accordance with an aspect of the present invention. FIG. 20 illustrates a communications device 2000 (also referred to as device) such as a cell phone, PDA or other service for example, wherein the device includes one or more of the following components: a communications decision maker at 2010 that processes incoming communications in view of a contactee's preferences (and other variables) that are stored in a communications preferences store 2014. A memory 2018 stores outgoing messages, whereas a memory 2022 receives incoming messages. An identities store 2026 stores information relating to people and groups that desire to communicate with the contactee. A calendar store 2030 stores information regarding meetings and other properties of the contactee's availability including interruptibility information. Other aspects of the device 2000 may include location information at 2034 (e.g., GPS), perceptual sensors at 2038 (e.g., accelerometer, ambient acoustics), and alerting modalities at 2042 (e.g., vibrate, sounds, displays, acoustical alerts).

FIGS. 21-26 depict some possible exemplary interactions with a communications device adapted in accordance with the present invention. It is to be appreciated that the concepts described herein can apply to substantially any type of computing device capable of interacting with other parties and can include a plurality of variations of interactions given preferences and other variables (e.g., identity, availability, interruptability, goals) associated with different communicating parties.

Figure 21:
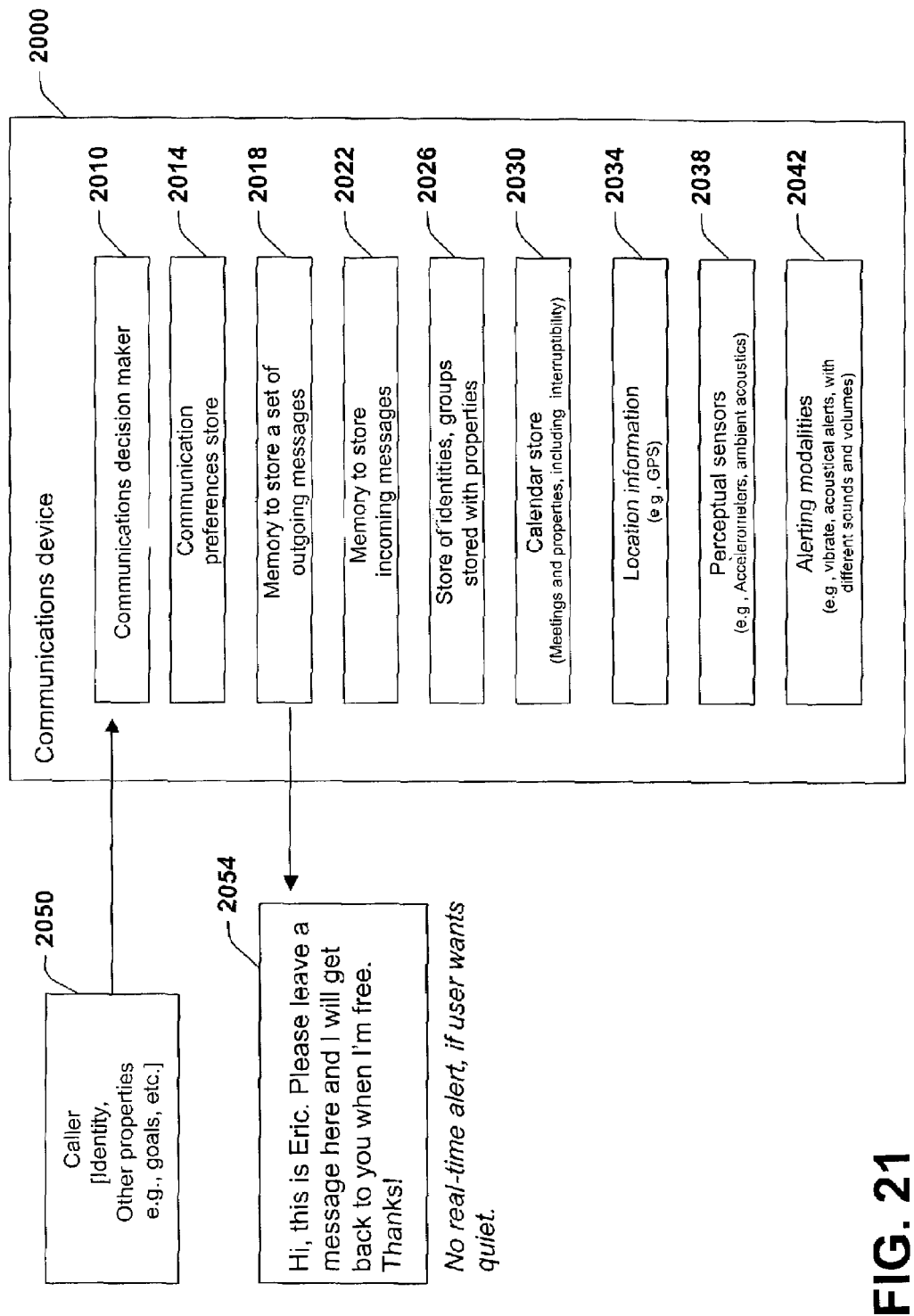

Proceeding to FIG. 21, one type of call processing is illustrated. In this example, a caller directs a message 2050 to the device 2000 that is processed by the communications decision maker 2010. The message 2050 includes encoded information such as the caller's identity and/or other properties such as what are the goals of the caller. In this example, since the caller is not identified as having a special relationship to the contactee, a standard reply such as "Please leave a message" is transmitted at 2054. If desired, the user can configure the device 2000 for no real time alerts.

Figure 22:
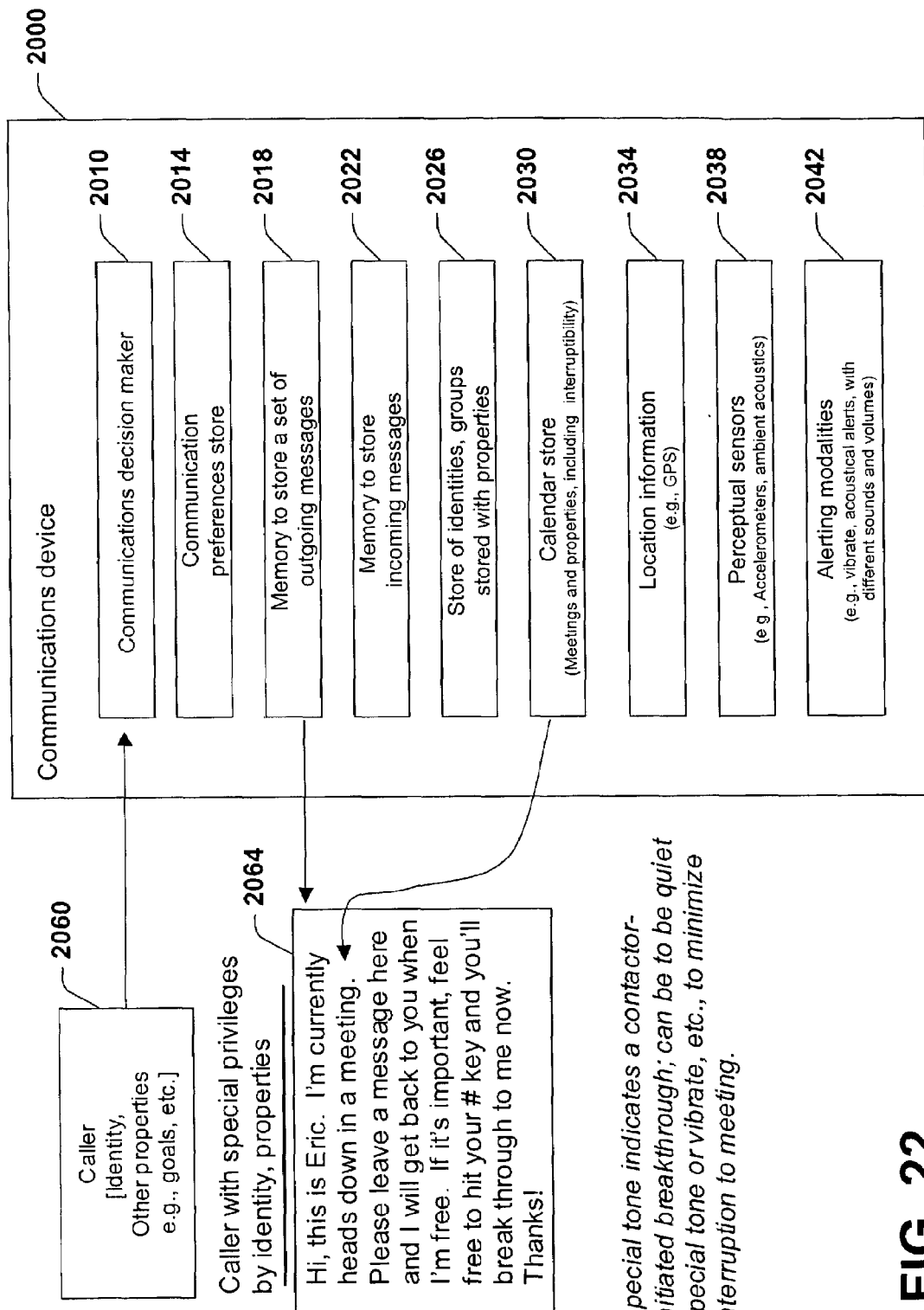

In FIG. 22, a message 2060 is directed from a caller who is identified as having one or more privileges (via an encoding of privilege or identity information in the message) and as specified in the identities store 2026 and/or communications preferences store 2014. Based upon the identity or other property of the caller, a message 2064 is delivered to caller, wherein the message has embedded information that the contactee is currently in a meeting—as derived from the calendar store 2030, and is presently unable to speak. Moreover, if the caller is identified as having an even greater importance to the contactee, an additional breakthrough option can be provided giving the caller an option to press a button (or enter or speak a code) indicating a need to speak to the contactee now. If the caller selects the breakthrough option, a tone or other indications such as vibration can alert the contactee that an important or urgent message is at hand.

Figure 23:
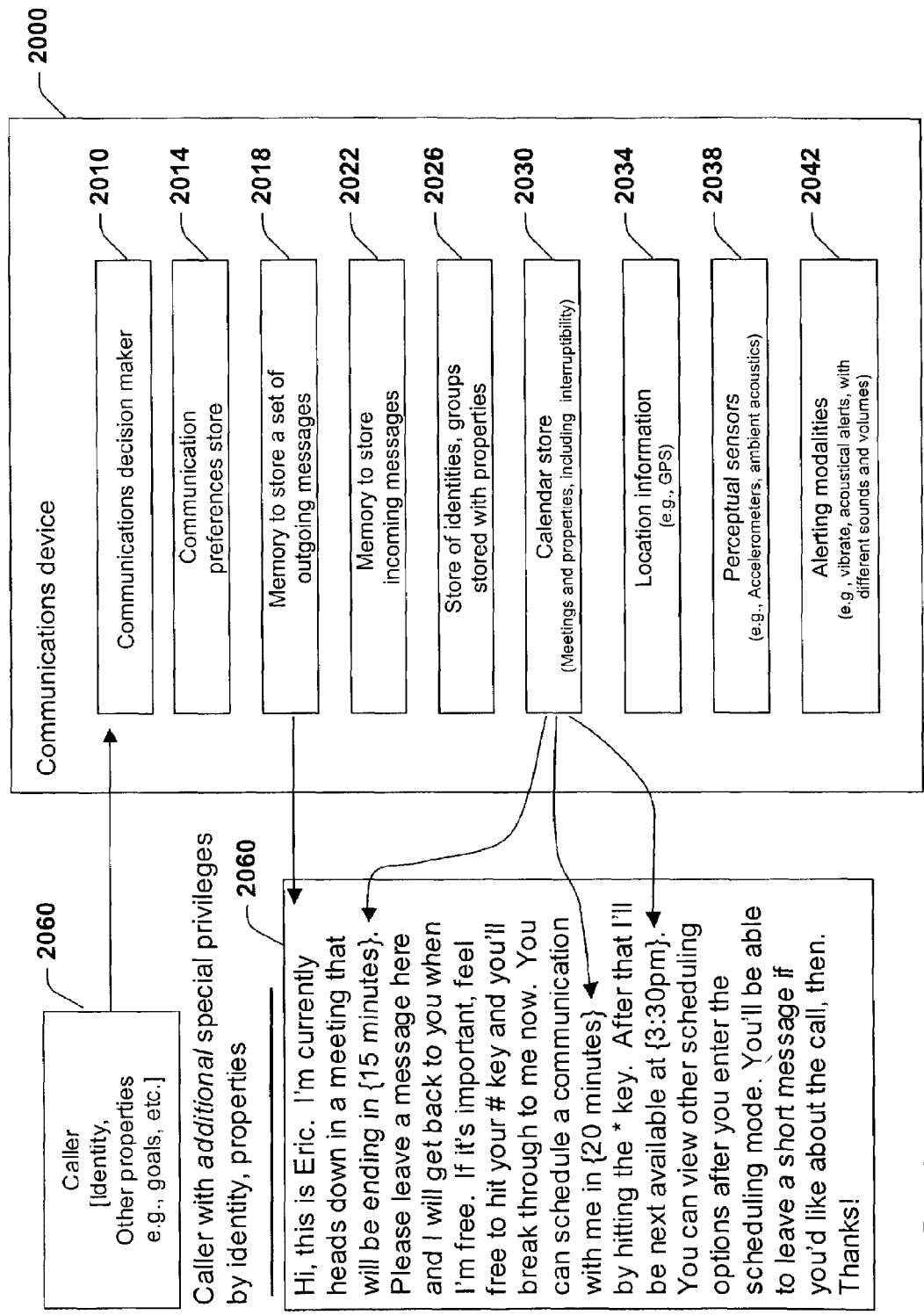

In FIG. 23, a message 2070 is delivered from a caller having even greater privileges than the caller in FIG. 22. In this example, a message 2074 indicates that the contactee is currently in a meeting that will be ending in [e.g., 15 minutes] or other time, a breakthrough option is provided, an option for scheduling future communications is provided [e.g., 20 minutes from now], and a future availability option is provided [e.g., available at 3:30 pm]. Such timing information can be automatically determined from the calendar store 2030 and can be embedded in the message 2074 as voice encodings and in the contactee's own voice, if desired.

Figure 24:
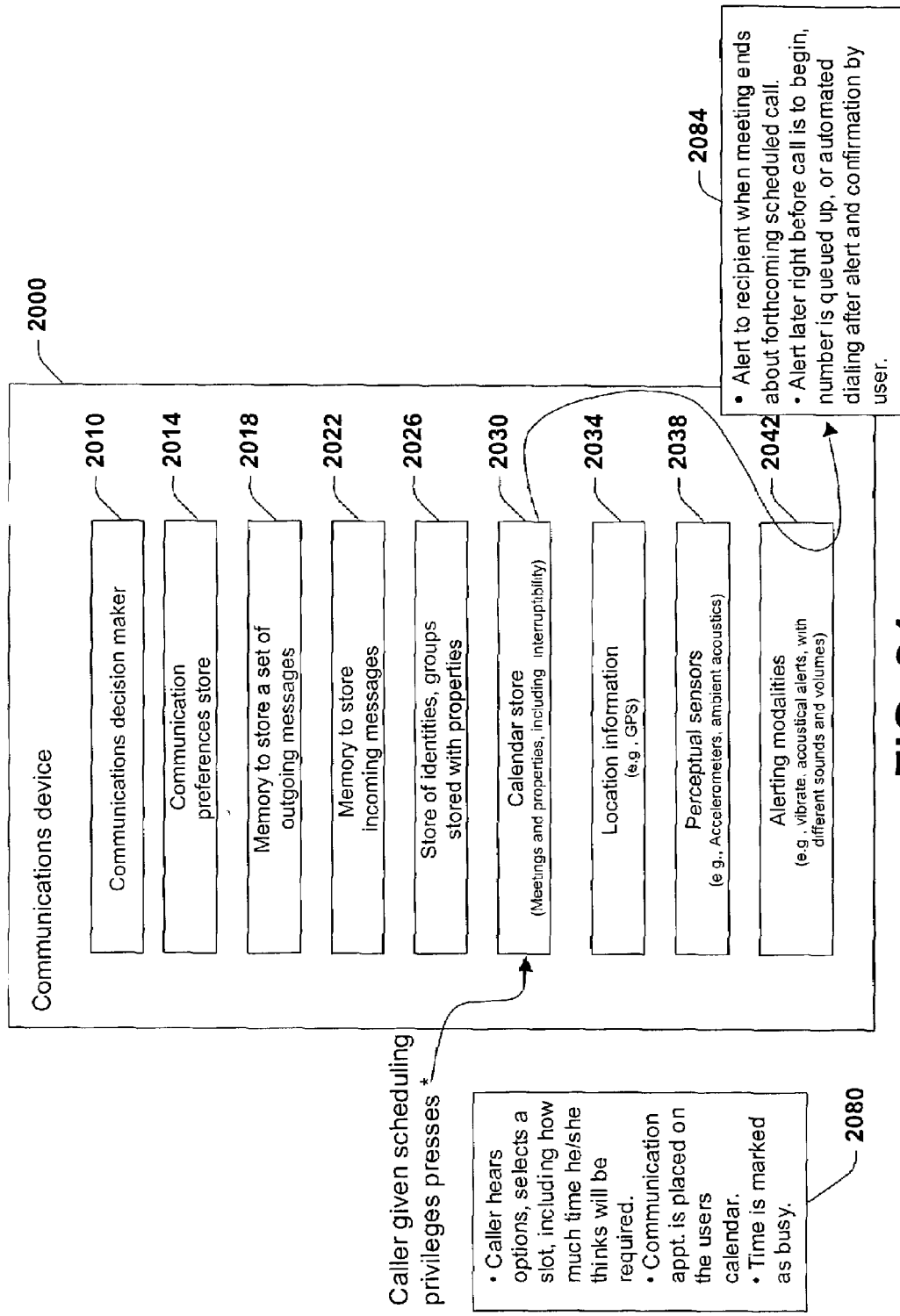

In FIG. 24, a caller is given scheduling privileges at 2080 (e.g., press * or other key for scheduling options). For example, the caller hears options (or display) at 2080, selects a scheduling slot as provided from the calendar store 2030, including how much time he/she thinks will be required. A communication appointment is then automatically placed on the user's calendar, wherein time for the slot is marked as busy. At 2084, an alert can be provided to the user when the meeting ends (or when available) about the forthcoming scheduled call. In addition, an alert can be delivered at a later time right before call is to begin, for example, wherein a contact number can be queued up, or automated dialing can commence after alert and confirmation by the user.

Figure 25:
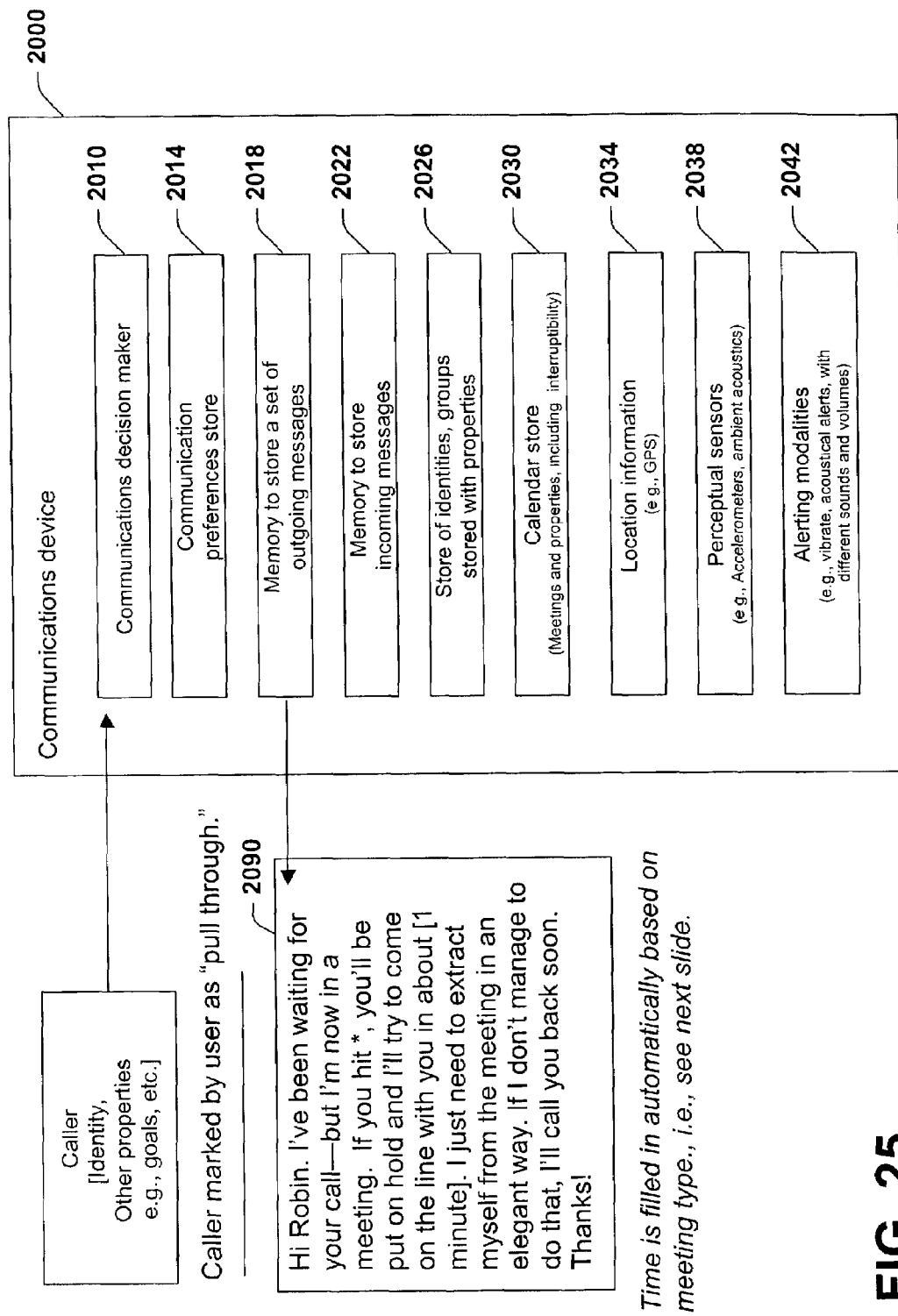
Figure 26:
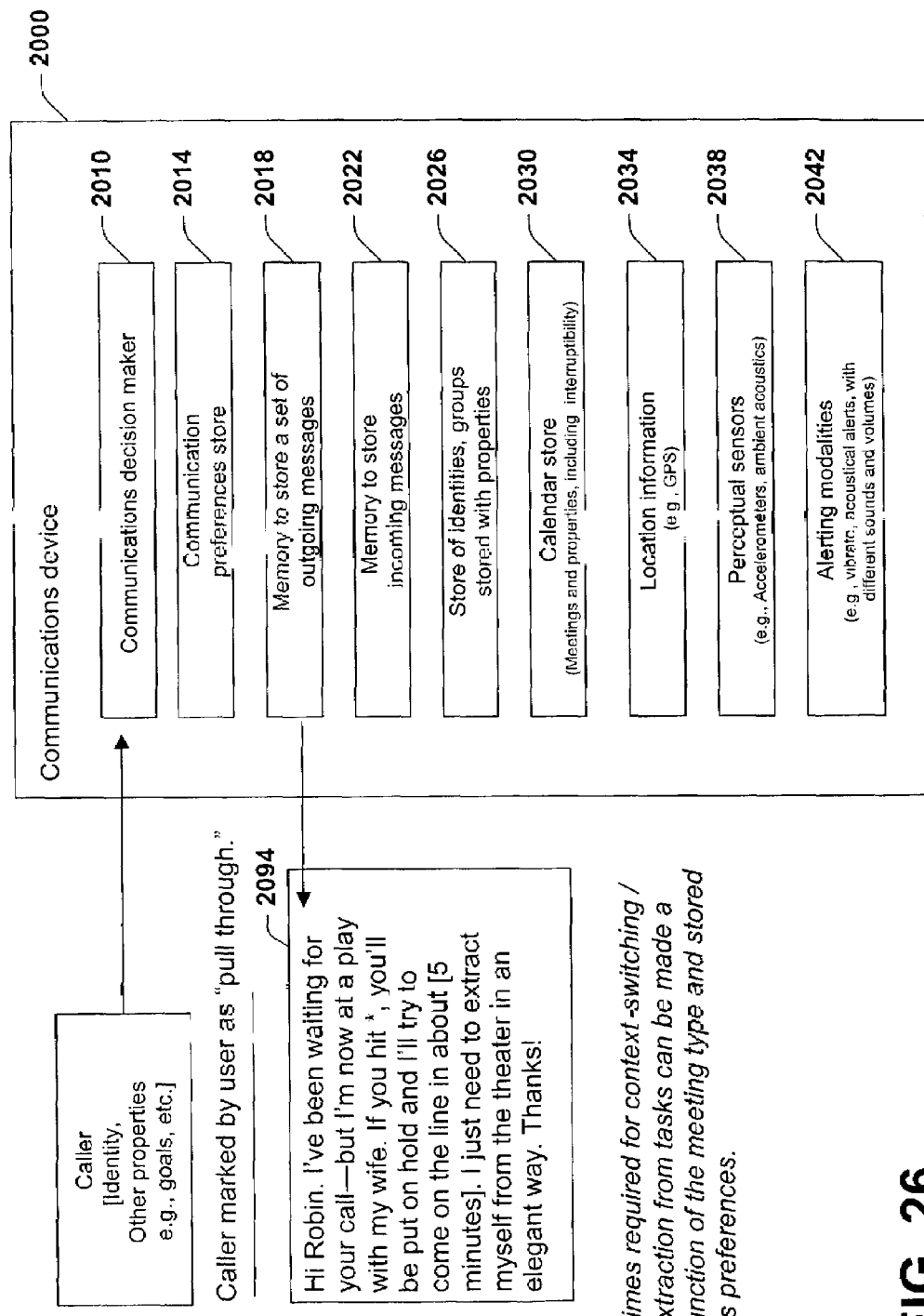

FIGS. 25 and 26 illustrate how time and context information can be embedded within outgoing messages to a caller, wherein time can be embedded automatically in messages based on such factors as meeting type, for example. Furthermore, in these examples, callers are tagged as "pull through" by the user of the device 2000. It is noted that times for various meeting types required for context-switching and extraction from tasks can be stored in the communications preferences store 2014. In FIG. 25, a message 2090 indicates that the user is currently in a meeting and that if a key such as "*" is selected, the user will attempt to contact the caller in about [1 minute], for example. In FIG. 26, a different meeting type is indicated (e.g., a play) and if the "*" key is selected, the user will attempt to contact the caller in about [5 minutes], for example. As can be appreciated, a plurality of various meeting types can be configured, with respective meeting types associated with similar or differing times for extracting oneself from the meeting and to subsequently contact the caller.

Figure 27:
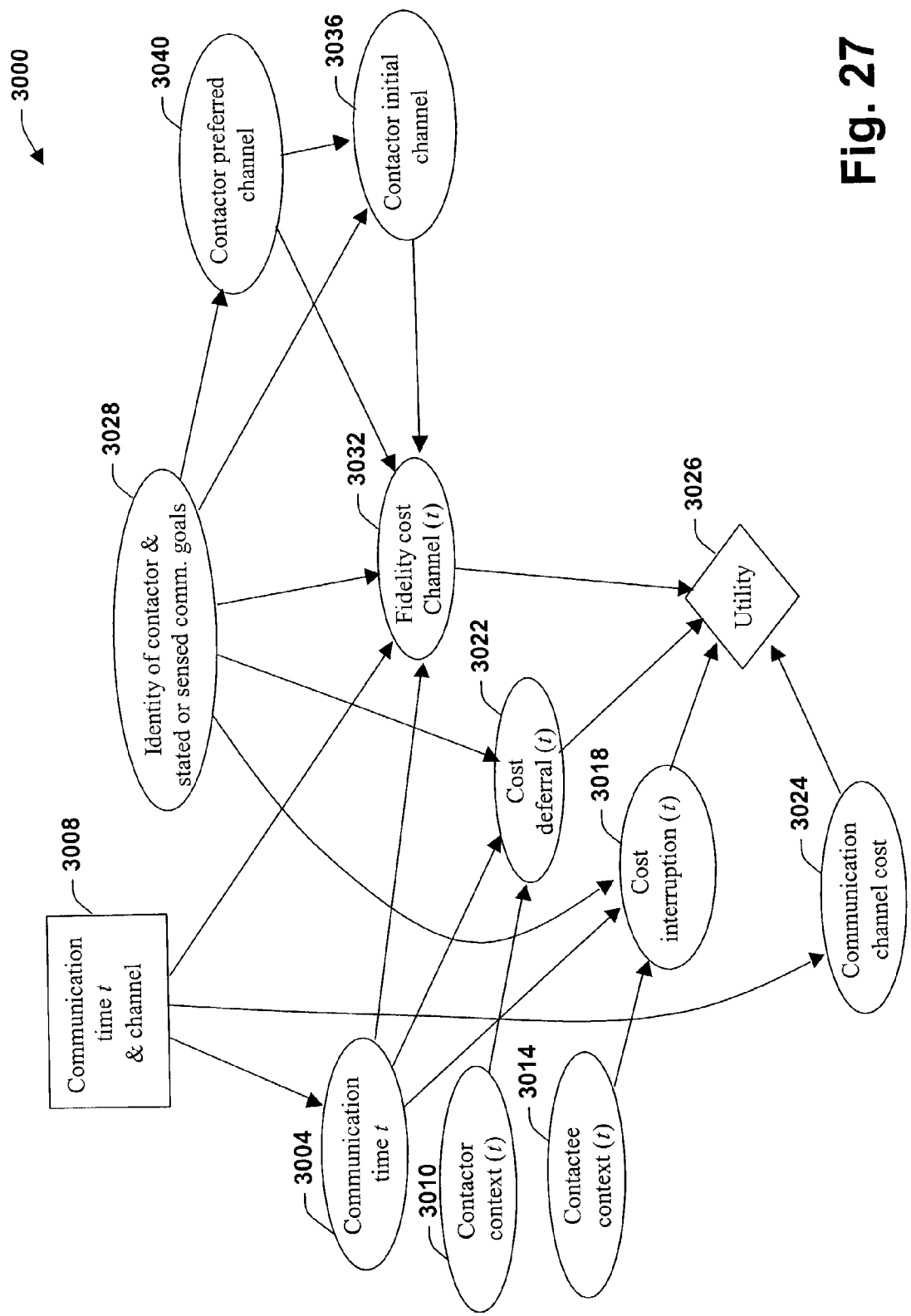
FIG. 27 illustrates an influence diagram in accordance with an aspect of the present invention.

FIG. 27 illustrates an influence diagram in accordance with an aspect of the present invention. FIG. 27 represents an influence diagram 3000 capturing in more general form the decision problem associated with the present invention. Influence diagrams are well known in the decision science community as providing a representation, in a graphical manner, of a decision model, capturing key variables, actions, and preferences, under uncertainty. The influence-diagram model includes key random variables (oval nodes), actions (square node), and the overall value of the outcome of actions (diamond-shaped node). Influence diagram processing algorithms can be employed to identify the action with the highest expected utility, given the uncertainties and certainties about the variables. However, the decision models more generally represent a maximum utility decision problem, and can be solved in a variety of ways, beyond the use of special influence diagram processing algorithms.

FIG. 27 depicts a basic decision model 3000 for making expected value decisions about communications, considering the time of the communication at 3004 and 3008, the context of the contactor and contactee at different times at 3010 and 3014. The context of the contactor and contactee influences the cost of interruption at 3018 and the costs of deferral at different future times at 3022, which in turn, together with the cost of the use of the communication channel at 3024, include the utility of different communication channels at 3026 and time for the communications. The cost of deferral 3022 is influenced by the identity of the contactor and the stated or sensed communication goals at 3028. The identity and goals also influences the cost associated with the fidelity of the communication channel at 3032. The model 3000 also considers the influence of the contactors initial channel of contact at 3036 and the contactor's preferred channel at 3040.

User interfaces and communications components as described herein are provided to users, making available parameters to set or modify the preferences in terms of the costs and values represented in the utility variable 3026. User interfaces can also provide for the specification of the allowable actions captured in the decision node, as well as for setting key uncertainties, such as prior probabilities and conditional probabilities or their approximations.

What has been described above includes examples of the present invention. It is of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:

1. A system that facilitates maximizing utility of a communication, the system comprising:
   an identifier that identifies an initially selected communication channel; and
   an analyzer that determines whether the initially selected communication channel should be overridden by an overriding communication channel, wherein the initially selected communication channel is overridden if EU2−cost>EU1, where EU2=E[u($d_i$,c)]=$s_j \in s_2$ $\Sigma u(s_j,d_i)$ p($s_j$|$d_i$,c), EU1=E[u($d_i$,c)]=$s_j \in s_1 \Sigma u(s_j,d_i)$ p($s_j$|$d_i$,c) and, cost measures actual dollar cost; wherein p($s_j$|$d_i$,c) represents a probability of achieving a future state $s_j$ given a decision $d_i$ concerning communication channel parameters and a context c; each individual outcome state $s_j \in s$ represents a possible match of preferences to related communication parameters; and function u($s_j$, $d_i$) represents a utility of state $s_j$ after the decision $d_i$ has been made.

2. The system of claim 1, the analyzer calculating an expected utility associated with the initially selected communication channel.

3. The system of claim 2, the analyzer calculating an expected utility associated with employing the overriding communication channel.

4. The system of claim 3, the analyzer calculating a cost associated with switching from the initially selected communication channel to the overriding communication channel.

5. The system of claim 1, where at least one of EU1 and EU2 is calculated using non-deterministic data.

6. The system of claim 1 where the analyzer determines whether a communicating party should be presented with information concerning the overriding communication channel(s).

7. The system of claim 1, the override analyzer comprising an override interface that presents a communicating party with override information concerning whether the initially selected communication channel should be overridden.

8. The system of claim 7, where the override interface presents the override information to a communicating party visually.

9. The system of claim 7, where the override interface presents the override information to a communicating party audibly.

10. The system of claim 7, where the override interface presents the override information to a communicating party via haptics.

11. The system of claim 1, comprising a learning system that adapts how the override analyzer determines whether the initially selected communication channel should be overridden.

12. The system of claim 1, where the identifier comprises:
   a preference resolver that analyzes a contactee preference data and a contactor preference data, and produces a resolved preference data;
   a context analyzer that analyzes a contactee context data and a contactor context data, and produces an analyzed context data;
   a channel analyzer that analyzes one or more communication channels that facilitate establishing the communication between the communicating parties, and produces a communication channel data; and
   a communication establisher that establishes a communication between a contactor and a contactee based, at least in part, on the resolved preference data, the analyzed context data, a communicating party selection and the communication channel data.

13. The system of claim 12, where the communication established by the communication establisher is selected, at least in part, on input received from the override analyzer.

14. The system of claim 1, where identifying a communication channel comprises at least one of: reasoning under uncertainty and deterministic processing.

15. A computer readable medium storing computer executable components of the system of claim 1.

16. A method for selecting a communication channel, the method comprising:
   identifying a communication channel that facilitates optimizing the utility of a communication between communicating parties;
   computing an override decision concerning whether the identified communication channel should be overridden, wherein the override decision is based at least in part upon EU2−cost>EU1, where EU2=E[u($d_i$,c)]=$s_j \in s_2 \Sigma u$ ($s_j$,$d_i$) p($s_j$|$d_i$,c), EU1=E[u($d_i$,c)]=$s_j \in s_1 \Sigma u(s_j,d_i)$ p($s_j$|$d_i$,c) and, cost measures actual dollar cost; wherein p($s_j$|$d_i$,c) represents a probability of achieving a future state $s_j$ given a decision $d_i$ concerning communication channel parameters and a context c; each individual outcome state $s_j \in s$ represents a possible match of preferences to related communication parameters; and function u($s_j$,$d_i$) represents a utility of state $s_j$ after the decision $d_i$ has been made; and
   selecting a communication channel for the communication based, at least in part, on the override decision.

17. The method of claim 16, comprising:
   presenting a communicating party with information concerning the override decision;
   receiving an override decision response from the communicating party; and selecting the communication channel based, at least in part, on the override decision and the override decision response.

18. The method of claim 17, comprising:
adapting the process for computing an override decision based, at least in part, on the override decision response from the communicating party.

19. The method of claim 17, comprising:
adapting the process for identifying a communication channel for a communication based, at least in part, on the override decision response from the communicating party.

20. The method of claim 18, comprising:
adapting the process for identifying the communication channel for the communication based, at least in part, on the override decision response from the communicating party.

21. The method of claim 18, where adapting the process for computing the override decision is performed by machine learning.

22. The method of claim 19, where adapting the process for identifying the communication channel is performed by machine learning.

23. The method of claim 16, where identifying the communication channel comprises
determining one or more expected utilities associated with the communication based, at least in part, on analyzing a contactor data, a contactee data and a communication channel data.

24. The method of claim 23, where computing the override decision comprises
analyzing at least one of: the contactor data, the contactee data and the communication channel data.

25. The method of claim 23, where the contactor data comprises at least one of: a contactor situation data and a contactor preference data.

26. The method of claim 25, where the contactor situation data comprises at least one of: a contactor application data, a contactor user data and a contactor capability data.

27. The method of claim 25, where the contactor preference data comprises at least one of: a time data, a location data, a task data and a goal data.

28. The method of claim 23, where the contactee data comprises at least one of: a contactee situation data and a contactee preference data.

29. The method of claim 28, where the contactee situation data comprises at least one of: a contactee application data, a contactee user data and a contactee capability data.

30. The method of claim 28, where the contactee preference data comprises at least one of: a time data, a location data, a task data and a goal data.

31. The method of claim 23, where determining the one or more expected utilities comprises:
analyzing at least one of the contactor data and the contactee data to determine one or more relationships between at least one of the contactor data and the contactee data;
selecting one or more expected utility computation rules based, at least in part, on the relationships; and
applying the one or more expected utility computation rules to determine the expected utilities based, at least in part, on the relationships.

32. The method of claim 23, the contactor data comprising:
deterministic data associated with a current state of the contactor; and prediction data associated with a future possible state of the contactor.

33. The method of claim 23, the contactee data comprising:
deterministic data associated with a current state of the contactee; and
prediction data associated with a future possible state of the contactee.

34. The method of claim 33, where determining the one or more expected utilities comprises:
analyzing the contactee data to determine one or more missing contactee data values;
selectively inferring one or more missing contactee data values to produce one or more contactee data inferences;
analyzing the contactor data to determine one or more missing contactor data values;
selectively inferring one or more missing contactor data values to produce one or more contactor data inferences;
analyzing the one or more contactee data inferences and/or the one or more contactor data inferences to determine one or more relationships; and
applying one or more inference formulae to maximize the expected utility of the communication between the communicating parties.

35. The method of claim 34 where the inference formulae are decision-theoretic formulae.

36. The method of claim 34, the contactor data comprising:
deterministic data associated with a current state of the contactor; and
prediction data associated with a future possible state of the contactor.

37. The method of claim 34, the contactee data comprising:
deterministic data associated with a current state of the contactee; and
prediction data associated with a future possible state of the contactee.

38. A computer readable medium storing computer executable instructions operable to perform the method of claim 37.

39. A system for optimizing a contact between communicating parties, comprising:
means for determining one or more expected utilities associated with a contact between the parties based, at least in part, on data associated with one or more contactors, data associated with one or more contactees and data associated with one or more communication channels;
means for determining whether the contact should be based on the one or more expected utilities or whether the contact should be based on a communicating party response to an override interface, wherein the override interface presents an override decision based at least in part upon EU2−cost>EU1, where EU2=E[u(d$_i$,c)]=s$_j$ ∈ s$_2$ Σu(s$_j$,d$_i$) p(s$_j$|d$_i$,c) EU1=E[u(d$_j$,c)]=s$_j$ ∈ s$_1$ Σu(s$_j$,d$_i$) p(s$_j$|d$_i$,c) and, cost measures actual dollar cost; wherein p(s$_j$|d$_i$,c) represents a probability of achieving a future state s$_j$ given a decision d$_i$ concerning communication channel parameters and a context c; each individual outcome state s$_j$ ∈ s represents a possible match of preferences to related communication parameters; and function $u(s_j, d_i)$ represents a utility of state $s_j$ after the decision $d_i$ has been made; and means for establishing the contact.

40. In a computer system having a graphical user interface that comprises a display and a selection device, a method of providing and selecting from a menu on the display, the method comprising:

retrieving a first set of menu entries for the menu, each of the menu entries representing a communication with a calculated expected utility;

displaying the first set of menu entries on the display;

retrieving a second set of menu entries for the menu, each of the menu entries representing a potential overriding communication with a calculated expected utility;

displaying the second set of menu entries on the display;

receiving a menu entry selection signal indicative of the selection device selecting a selected menu entry from the first set and second set of menu entries; and in response to the menu entry selection signal, initiating a communication represented by the menu entry.

* * * * *